US012024930B2

(12) United States Patent
Cetnar et al.

(10) Patent No.: US 12,024,930 B2
(45) Date of Patent: Jul. 2, 2024

(54) CLOSURE LATCH ASSEMBLY WITH LATCH MECHANISM HAVING ROLLER PAWL ASSEMBLY

(71) Applicant: Magna Closures Inc., Newmarket (CA)

(72) Inventors: Roman Cetnar, Newmarket (CA); Franco Giovanni Ottino, San Giuliano Terme (IT); Kris Tomaszewski, Newmarket (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 17/990,792

(22) Filed: Nov. 21, 2022

(65) Prior Publication Data

US 2023/0078285 A1 Mar. 16, 2023

Related U.S. Application Data

(63) Continuation of application No. 16/268,603, filed on Feb. 6, 2019, now Pat. No. 11,512,509.

(Continued)

(51) Int. Cl.

*E05B 85/26* (2014.01)
*E05B 17/00* (2006.01)
*E05B 85/24* (2014.01)

(52) U.S. Cl.

CPC ............ *E05B 85/26* (2013.01); *E05B 17/007* (2013.01); *E05B 85/243* (2013.01); *E05Y 2900/531* (2013.01)

(58) Field of Classification Search

CPC .......... E05B 85/26; E05B 85/20; E05B 85/24; E05B 85/243; E05B 17/007; E05B 77/36;

(Continued)

(56) References Cited

U.S. PATENT DOCUMENTS 1,497,044 A * 6/1924 Terrell .................. E05B 17/007 292/341.12
1,821,148 A * 9/1931 Galamb .................. E05B 85/24 292/196

(Continued)

FOREIGN PATENT DOCUMENTS

CN 201526205 U * 7/2010 ............ E05B 85/24
CN 202391253 U * 8/2012

(Continued)

*Primary Examiner* — Alyson M Merlino
(74) *Attorney, Agent, or Firm* — Dickinson Wright PLLC

(57) ABSTRACT

A closure latch assembly having a latch mechanism is provided. The latch mechanism includes a ratchet and a pawl assembly pivotally supported for movement between a ratchet holding position whereat the pawl assembly is positioned to hold the ratchet in its striker capture position and a ratchet releasing position whereat the pawl assembly is located to permit movement of the ratchet to its striker release position. The pawl assembly has a carrier and a pawl configured for rotation relative to one another about a pawl pin and a roller carried by the carrier. The roller is disposed between the pawl and the ratchet for selective rolling movement therebetween. The roller is disposed into abutment with a closing surface of the ratchet while the pawl assembly is in the ratchet holding position and is spaced from closing surface while the pawl assembly is in the ratchet releasing position.

19 Claims, 36 Drawing Sheets

Related U.S. Application Data

(60) Provisional application No. 62/660,161, filed on Apr. 19, 2018, provisional application No. 62/628,061, filed on Feb. 8, 2018.

(58) Field of Classification Search
CPC ......... Y10T 292/1047; Y10T 292/1078; Y10T 292/1082; Y10T 292/14; Y10S 292/23; Y10S 292/56; Y10S 292/57; Y10S 292/58
See application file for complete search history.

(56) References Cited

U.S. PATENT DOCUMENTS

| | | | | | |
|---|---|---|---|---|---|
| 2,679,428 | A * | 5/1954 | Rop | E05B 65/0046 | 292/332 |
| 3,347,584 | A * | 10/1967 | Johnstone | E05B 85/26 | 292/216 |
| 3,870,354 | A * | 3/1975 | Prahl | E05B 63/122 | 70/464 |
| 4,518,180 | A * | 5/1985 | Kleefeldt | E05B 81/20 | 292/216 |
| 4,569,544 | A * | 2/1986 | Escaravage | E05B 85/26 | 292/201 |
| 4,588,217 | A * | 5/1986 | Escaravage | E05B 81/14 | 292/216 |
| 5,092,639 | A * | 3/1992 | Di Giusto | E05B 85/26 | 292/216 |
| 5,188,406 | A * | 2/1993 | Sterzenbach | E05B 85/26 | 292/216 |
| 5,474,339 | A | 12/1995 | Johnson | | |
| 5,941,579 | A * | 8/1999 | Baniak | E05B 85/26 | 292/201 |
| 7,111,877 | B2 | 9/2006 | Larsen et al. | | |
| 7,296,830 | B2 * | 11/2007 | Koveal | E05B 81/20 | 292/216 |
| 7,360,803 | B2 * | 4/2008 | Parent | E05B 85/26 | 292/216 |
| 7,434,852 | B2 * | 10/2008 | Spurr | E05B 85/26 | 292/201 |
| 8,528,950 | B2 * | 9/2013 | Organek | E05B 85/26 | 292/216 |
| 8,998,273 | B2 * | 4/2015 | Debroucke | E05B 85/26 | 292/201 |
| 9,194,163 | B2 * | 11/2015 | Margheritti | E05B 81/90 | |
| 10,745,947 | B2 * | 8/2020 | Okeke | E05B 85/26 | |
| 2005/0099016 | A1 * | 5/2005 | Inoue | E05B 81/20 | 292/216 |
| 2005/0205361 | A1 * | 9/2005 | Fisher | E05B 81/14 | 74/425 |
| 2006/0108811 | A1 | 5/2006 | Shimada et al. | | |
| 2007/0046035 | A1 * | 3/2007 | Tolley | E05B 85/045 | 292/201 |
| 2011/0074170 | A1 * | 3/2011 | Tomaszewski | E05B 85/02 | 292/220 |
| 2011/0127780 | A1 * | 6/2011 | Barth | E05B 85/243 | 292/213 |
| 2011/0169280 | A1 * | 7/2011 | Scholz | E05B 85/26 | 292/200 |
| 2011/0204660 | A1 * | 8/2011 | Cumbo | E05B 85/243 | 292/217 |
| 2011/0210565 | A1 * | 9/2011 | Scholz | E05B 85/26 | 292/200 |
| 2015/0308165 | A1 | 10/2015 | Scholz et al. | | |
| 2018/0163439 | A1 * | 6/2018 | Patane | E05B 85/26 | |
| 2019/0017301 | A1 * | 1/2019 | Cumbo | E05B 85/26 | |

FOREIGN PATENT DOCUMENTS

| | | | | | |
|---|---|---|---|---|---|
| CN | 102762807 | A | * | 10/2012 | E05B 85/26 |
| CN | 103967355 | A | | 8/2014 | |
| CN | 204511098 | U | * | 7/2015 | |
| CN | 105658890 | A | * | 6/2016 | E05B 85/243 |
| CN | 105658890 | A | | 6/2016 | |
| CN | 107152207 | A | * | 9/2017 | E05B 85/12 |
| DE | 102012021702 | A1 | * | 3/2014 | E05B 85/243 |
| DE | 102014003737 | A1 | * | 9/2015 | E05B 81/20 |
| EP | 406777 | A | * | 1/1991 | E05B 85/26 |
| EP | 1512815 | A1 | * | 3/2005 | E05B 77/24 |
| EP | 1402139 | B1 | * | 9/2007 | E05B 81/14 |
| FR | 2472651 | A | * | 7/1981 | E05B 17/007 |
| FR | 2701728 | A1 | * | 8/1994 | E05B 85/243 |
| GB | 2409705 | A | * | 7/2005 | E05B 85/26 |
| JP | 08199866 | A | * | 8/1996 | |
| JP | H0960381 | A | | 3/1997 | |
| WO | WO-2016090279 | A1 | * | 6/2016 | E05B 85/26 |
| WO | WO-2018169259 | A1 | * | 9/2018 | E05B 81/16 |

* cited by examiner

CLOSURE LATCH ASSEMBLY WITH LATCH MECHANISM HAVING ROLLER PAWL ASSEMBLY

CROSS-REFERENCE TO RELATED APPLICATIONS

This application is a continuation of U.S. patent application Ser. No. 16/268,603, filed on Feb. 6, 2019, which claims the benefit of U.S. Provisional Application Ser. No. 62/628,061, filed Feb. 8, 2018, and the benefit of U.S. Provisional Application Ser. No. 62/660,161, filed Apr. 19, 2018, all of which are incorporated herein by reference in their entirety.

FIELD

The present disclosure relates generally to automotive latches for closure panels.

BACKGROUND

This section provides background information related to automotive door latches and is not necessarily prior art to the inventive concepts associated with the present disclosure.

Motor vehicle closure panels, such as, for example, passenger side doors, are typically mounted by upper and lower door hinges to the vehicle body for swinging movement about a generally vertical pivot axis. Each side door hinge typically includes a door hinge strap connected to the side door, a body hinge strap connected to the vehicle body, and a pivot pin arranged to pivotably connect the door hinge strap to the body hinge strap and define the pivot axis. Such passenger side doors, also referred to as swing doors, have recognized issues such as, for example, undesirable high door latch release effort, which can be caused, at least in part, by high static frictional forces and dynamic frictional forces generated between a ratchet and pawl of the latch during relative movement between the ratchet and pawl. Current mechanisms for reducing friction between the ratchet and pawl can include a double pawl configuration, special low friction lubrication, and/or low friction plating. Although the aforementioned mechanisms can help in reducing static and dynamic friction, there remain disadvantages associated therewith, such as a relatively short life of lubrication and plating due to being worn away, as well as undesirable manufacturing complexities and cost associate therewith. Beyond the aforementioned issues, there remains a desire to increase the reduction of friction between a ratchet and pawl beyond the reduction of friction provided by known mechanisms, and to maintain the reduced friction over the useful life of the latch assembly.

In view of the above, there remains a need to develop a closure latch assembly which addresses and overcomes at least those disadvantages discussed above.

SUMMARY

This section provides a general summary of the present disclosure and is not a comprehensive disclosure of its full scope or all of its features, aspects and objectives.

It is an aspect of the present disclosure to provide a latch assembly for a vehicle closure panel of motor vehicles that provides minimal friction resistance between a ratchet and pawl during relative movement between the ratchet and pawl.

It is another aspect of the present disclosure to provide a latch assembly for use in a passenger swing door of the motor vehicle.

It is another aspect of the present disclosure to maintain minimal friction resistance between the ratchet and pawl over the useful life of a latch assembly without need of service.

It is another aspect of the present disclosure to provide a latch assembly being economical in manufacture, having a long and useful life, and being useful in a broad range of closure panel configurations.

Based on these and other aspects and objectives of the present disclosure, a closure latch assembly having a latch mechanism is provided, wherein the latch mechanism includes a frame plate with a ratchet pivotally supported thereon by a ratchet pivot pin, wherein the ratchet is moveable between a striker release position whereat the ratchet is positioned to release a striker, a striker capture position whereat the ratchet is positioned to retain the striker, with the ratchet being biased toward its striker release position and having a closing notch. The latch assembly further incudes a pawl assembly pivotally supported on the frame plate by a pawl pin for movement between a ratchet holding position whereat the pawl assembly is positioned to hold the ratchet in the striker capture position and a ratchet releasing position whereat the pawl assembly is located to permit movement of the ratchet to the striker release position, wherein the pawl assembly is biased toward the ratchet holding position. The pawl assembly has a carrier plate and a pawl configured for rotation relative to one another about the pawl pin and a roller carried by the carrier for rotation thereon. The roller is disposed between the pawl and the ratchet for selective rolling contact with the pawl and the ratchet. The roller is received in the closing notch of the ratchet while the pawl assembly is in the ratchet holding position and is removed from closing notch while the pawl assembly is in the ratchet releasing position.

It is a further aspect of the present disclosure to provide the carrier plate and the pawl pin having a clearance fit with one another to avoid radial loading through the carrier plate.

It is a further aspect of the present disclosure to provide loading between the ratchet and the pawl solely through the roller.

It is a further aspect of the present disclosure to provide pure rolling movement of the roller against the ratchet and the pawl to avoid sliding friction between the roller and the ratchet and between the roller and the pawl, thereby minimizing the force required to actuate the latch mechanism and minimizing the wear and noise generated during actuation of the latch mechanism.

It is a further aspect of the present disclosure to provide the roller being cantilevered from the carrier plate.

It is a further aspect of the present disclosure to provide the roller having a cylindrical outer surface.

It is a further aspect of the present disclosure to provide the carrier plate having a through opening sized for a clearance fit of the pawl rivet therethrough.

It is a further aspect of the present disclosure to provide the through opening in the carrier plate being non-circular.

It is a further aspect of the present disclosure to provide the through opening in the carrier plate being elliptical.

It is a further aspect of the present disclosure to provide the carrier plate having a planar main body with an arm and a nose region extending therefrom with a recessed pocket extending between the arm and the nose region, with the pawl having a pawl pin extending through the recessed pocket for pivotal movement within the recessed pocket between about 5 to 15 degrees to prevent the carrier plate from being loaded while the roller is rolling between the ratchet and the pawl.

It is a further aspect of the present disclosure to maintain the pawl pin in spaced relation between the arm and the nose region while the pawl assembly is in the ratchet holding position.

In accordance with a further aspect of the present disclosure, a closure latch assembly having a latch mechanism is provided, wherein the latch mechanism includes a frame plate and a ratchet pivotally supported on the frame plate by a ratchet pivot pin. The ratchet is configured for movement between a striker release position whereat the ratchet is positioned to release a striker, a striker capture position whereat the ratchet is positioned to retain the striker, with the ratchet being biased toward its striker release position and having a closing surface. The latch assembly further incudes a pawl assembly pivotally supported on the frame plate by a pawl rivet for movement between a ratchet holding position whereat the pawl assembly is positioned to hold the ratchet in its striker capture position and a ratchet releasing position whereat the pawl assembly is located to permit movement of the ratchet to its striker release position, wherein the pawl assembly is biased toward the ratchet holding position. The pawl assembly has a carrier and a pawl configured for rotation relative to one another about the pawl rivet and has a roller carried by the carrier. The roller is disposed between the pawl and the ratchet for selective rolling contact with the pawl and the closing surface of the ratchet. The roller is disposed against the closing surface of the ratchet while the pawl assembly is in the ratchet holding position and is removed from closing surface while the pawl assembly is in the ratchet releasing position.

It is a further aspect of the present disclosure to provide the at least one planar body surface including a pair of planar body surfaces spaced in parallel relation from one another, with the roller being supported for rolling movement between the nose region of each planar body surface.

It is a further aspect of the present disclosure to provide the nose regions of the pair of planar body surfaces having through openings, with the roller being supported for rolling movement on an axle extending into the though openings.

It is a further aspect of the present disclosure to provide the roller and the axle as a monolithic piece of material.

It is a further aspect of the present disclosure to provide the carrier as a monolithic piece of material.

It is a further aspect of the present disclosure to provide the carrier as a molded, resilient piece of material.

It is a further aspect of the present disclosure to provide a stop surface extending laterally from the frame plate, with the arms of the planar body surfaces being configured into biased abutment with the stop surface to releasably hold the pawl assembly in the ratchet holding position.

It is a further aspect of the present disclosure to provide the arms of the planar body surfaces being biased into abutment with the stop surface when the ratchet is in the striker release position.

In accordance with a further aspect of the present disclosure, a closure latch assembly having a latch mechanism including the following is provided: a frame plate; a ratchet pivotally supported on the frame plate for movement between a striker release position whereat the ratchet is positioned to release a striker, a striker capture position whereat the ratchet is positioned to retain the striker, the ratchet being biased toward the striker release position, with the ratchet having a closing surface. Further, a pawl assembly is pivotally supported on the frame plate for movement between a ratchet holding position whereat the pawl assembly holds the ratchet in the striker capture position and a ratchet releasing position whereat the pawl assembly permits movement of the ratchet to the striker release position, the pawl assembly being biased toward the ratchet holding position. The pawl assembly has a carrier, a pawl and a roller carried by the carrier. The roller is disposed between the pawl and the ratchet for selective contact with the pawl and the closing surface of the ratchet, with the roller contacting the closing surface while the pawl assembly is in the ratchet holding position and being spaced from the closing surface while the pawl assembly is in the ratchet releasing position, wherein the roller is cantilevered from the carrier.

In accordance with a further aspect of the present disclosure, a closure latch assembly having a latch mechanism including the following is provided: a frame plate; a ratchet pivotally supported on the frame plate for movement between a striker release position whereat the ratchet is positioned to release a striker, a striker capture position whereat the ratchet is positioned to retain the striker, with the ratchet being biased toward the striker release position, with the ratchet having a closing surface. Further, a pawl assembly is pivotally supported on the frame plate for movement between a ratchet holding position whereat the pawl assembly holds the ratchet in the striker capture position and a ratchet releasing position whereat the pawl assembly permits movement of the ratchet to the striker release position, with the pawl assembly being biased toward the ratchet holding position. The pawl assembly has a carrier, a pawl and a roller carried by the carrier. The roller is disposed between the pawl and the ratchet for selective contact with the pawl and the ratchet closing surface, with the roller contacting the closing surface while the pawl assembly is in the ratchet holding position and being spaced from the closing surface while the pawl assembly is in the ratchet releasing position. The carrier has a pair of planar body surfaces spaced in parallel relation from one another, wherein the roller is supported for rolling movement between the planar body surfaces.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein:

FIG. 10A-1 is a view similar to FIG. 10A with various components removed for clarity of an interaction between various levers of the closure latch assembly;

FIG. 10B-1 is a view similar to FIG. 10B with various components removed for clarity of an interaction between various levers of the closure latch assembly;

FIGS. 11A-1 through 11C-1 are respective back side views of the view of FIGS. 11A-11C;

FIG. 12A-1 is a view similar to FIG. 12A with various components removed for clarity of an interaction between various levers of the closure latch assembly;

FIG. 12B-1 is a view similar to FIG. 12B with various components removed for clarity of an interaction between various levers of the closure latch assembly;

DETAILED DESCRIPTION OF EXAMPLE EMBODIMENTS

Figure 1:
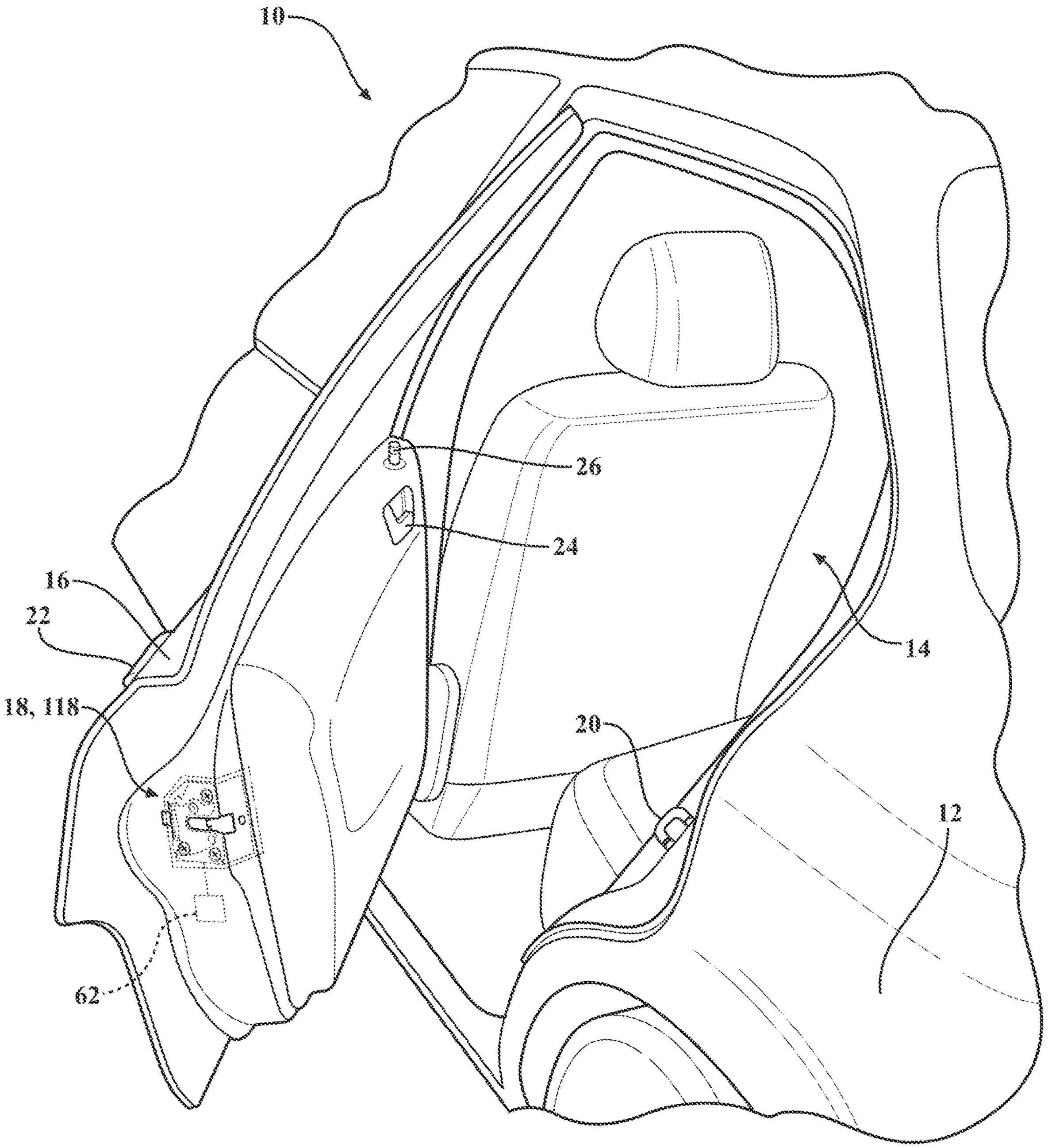
FIG. 1 is a partial perspective view of a motor vehicle illustrating a passenger swing door equipped with a closure latch assembly in accordance with one aspect the present disclosure.

A series of example embodiments of a closure latch assembly for use in a motor vehicle closure system will now be described more fully with reference to the accompanying drawings. To this end, the example embodiments of the closure latch assembly is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiments may be embodied in many different forms, and that the example embodiments should not be construed to limit the scope of the present disclosure. In some parts of the example embodiments, well-known processes, well-known device structures, and well-known technologies are not described in detail.

In the following detailed description, the expression "closure latch assembly" will be used to generally indicate any latch mechanism adapted for use with a vehicle closure panel. Additionally, the expression "closure panel" will be used to indicate any element mounted to a vehicle body portion of a motor vehicle and moveable between an open position and at least one closed position, respectively opening and closing an access to an inner compartment of the motor vehicle, and therefore includes, without limitations, decklids, tailgates, liftgates, bonnet lids, and sunroofs in addition to the sliding or pivoting passenger doors of the motor vehicle to which the following description will make explicit reference, purely by way of example.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1 of the drawings, a motor vehicle 10 is shown to include a vehicle body 12 defining an opening 14 to an interior passenger compartment. A closure panel 16, for example a vehicle door, shown as a swing door 16, is illustratively shown pivotably mounted to vehicle body 12 for movement between an open position (shown) and a fully-closed position to respectively open and close opening 14. A closure latch assembly 18 is shown secured to closure panel 16 adjacent to an edge portion thereof and includes a latch mechanism 19 that is releasably engageable with a striker 20 fixedly secured to a recessed edge portion of vehicle body 12. As will be detailed, closure latch assembly 18 is operable to engage striker 20 and releasably hold closure panel 16 in its fully-closed position. An outside handle 22 and an inside handle 24 are provided for selectively actuating the latch mechanism 19 of closure latch assembly 18 to release striker 20 from the latch mechanism 19 and permit subsequent movement of closure panel 16 to its open position. An optional lock knob 26 provides a visual indication of the locked state of closure latch assembly 18 and which may also be operable to mechanically change the locked/unlocked state of closure latch assembly 18. For purpose of clarity and functional association with motor vehicle 10, the closure panel is hereinafter referred to as vehicle door 16.

A detailed description of a non-limiting example of closure latch assembly 18, constructed in accordance with the teachings of the present disclosure, will now be provided. In general, closure latch assembly 18 includes latch mechanism 19, which in turn includes a release lever 28, a roller pawl assembly, referred to hereafter as pawl assembly 30, a release lever link 32 bridging and selectively connecting the release lever 28 in operable communication with the pawl assembly 30, a lock lever 34 configured for selective movement between a locked position, an emergency lock knob 36, a key unlock cable 38, and an outside release lever 40 operably connected to outside handle 22 via a connective member 41, such as a rod, cable or the like. It will be readily appreciated by one skilled in the art that the above components can be mounted to and within a housing, sometimes referred to as frame plate 42, suitably shaped for the intended vehicle application, with a housing cover or frame plate cover 44 supporting and enclosing the above-noted mechanisms.

Figure 2:
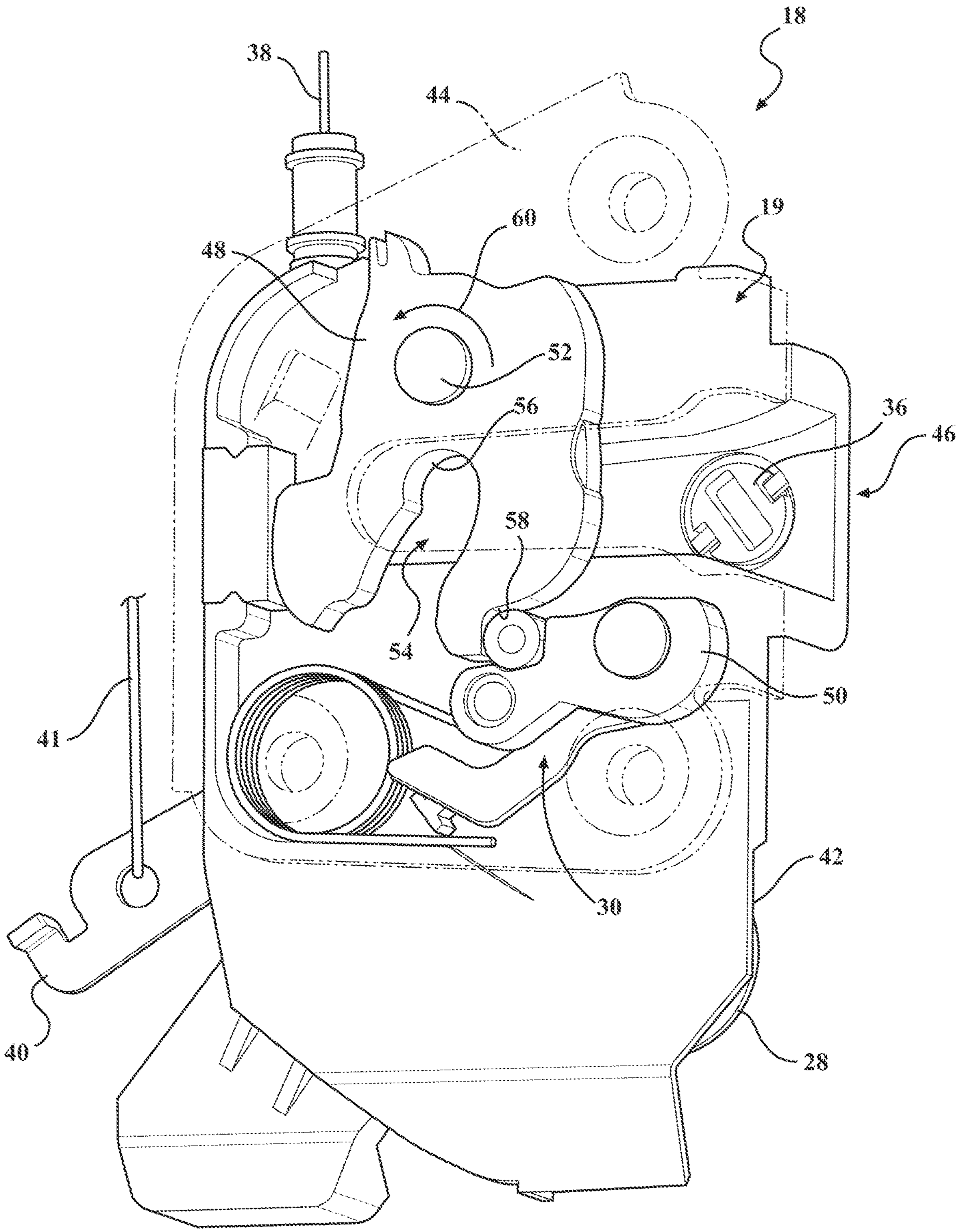
FIG. 2 is a front side view of a closure latch assembly in accordance with one aspect of the disclosure configured for use in the passenger swing door of FIG. 1.
Figure 3:
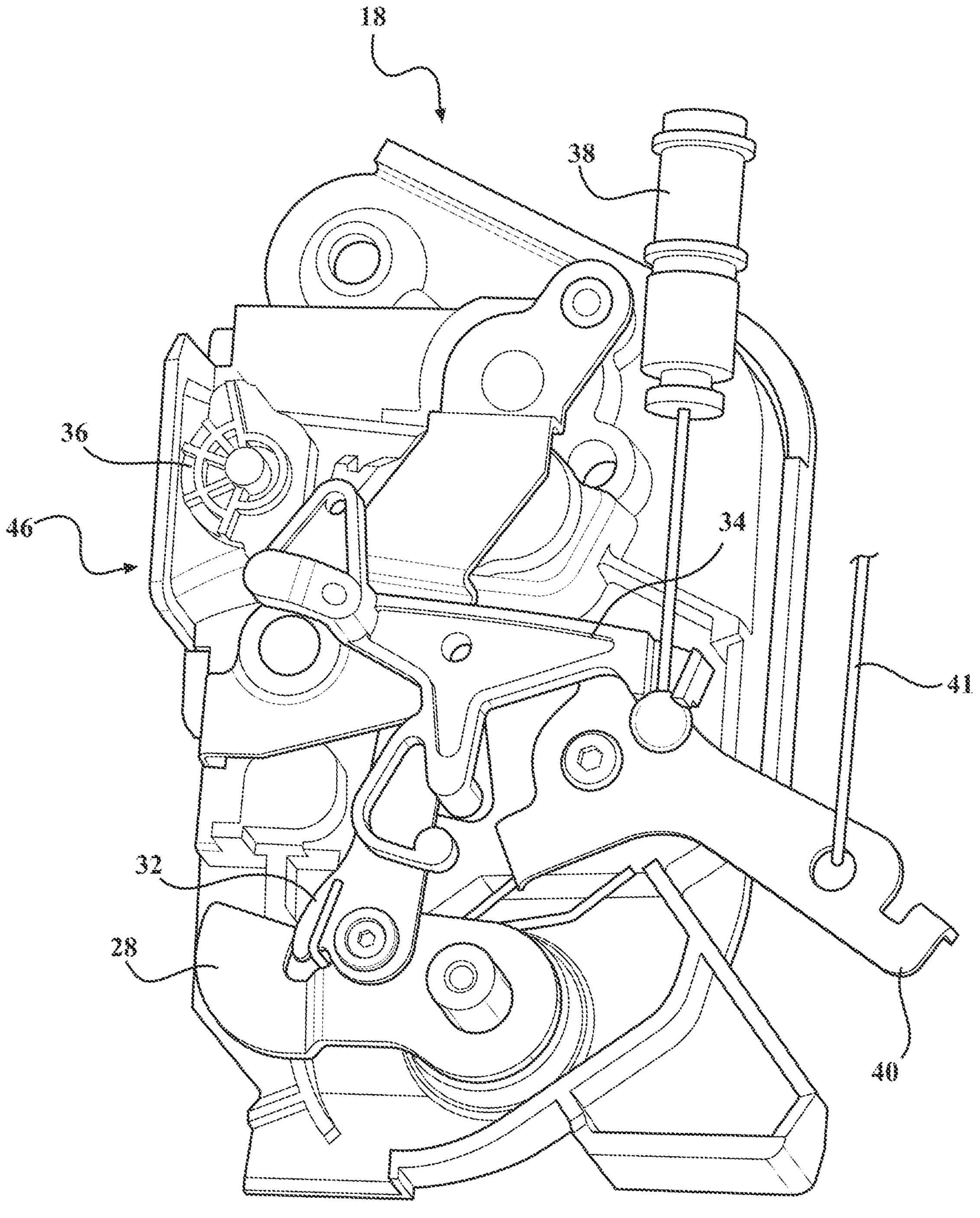
FIG. 3 is a back side view of the closure latch assembly of FIG. 2.
Figure 4:
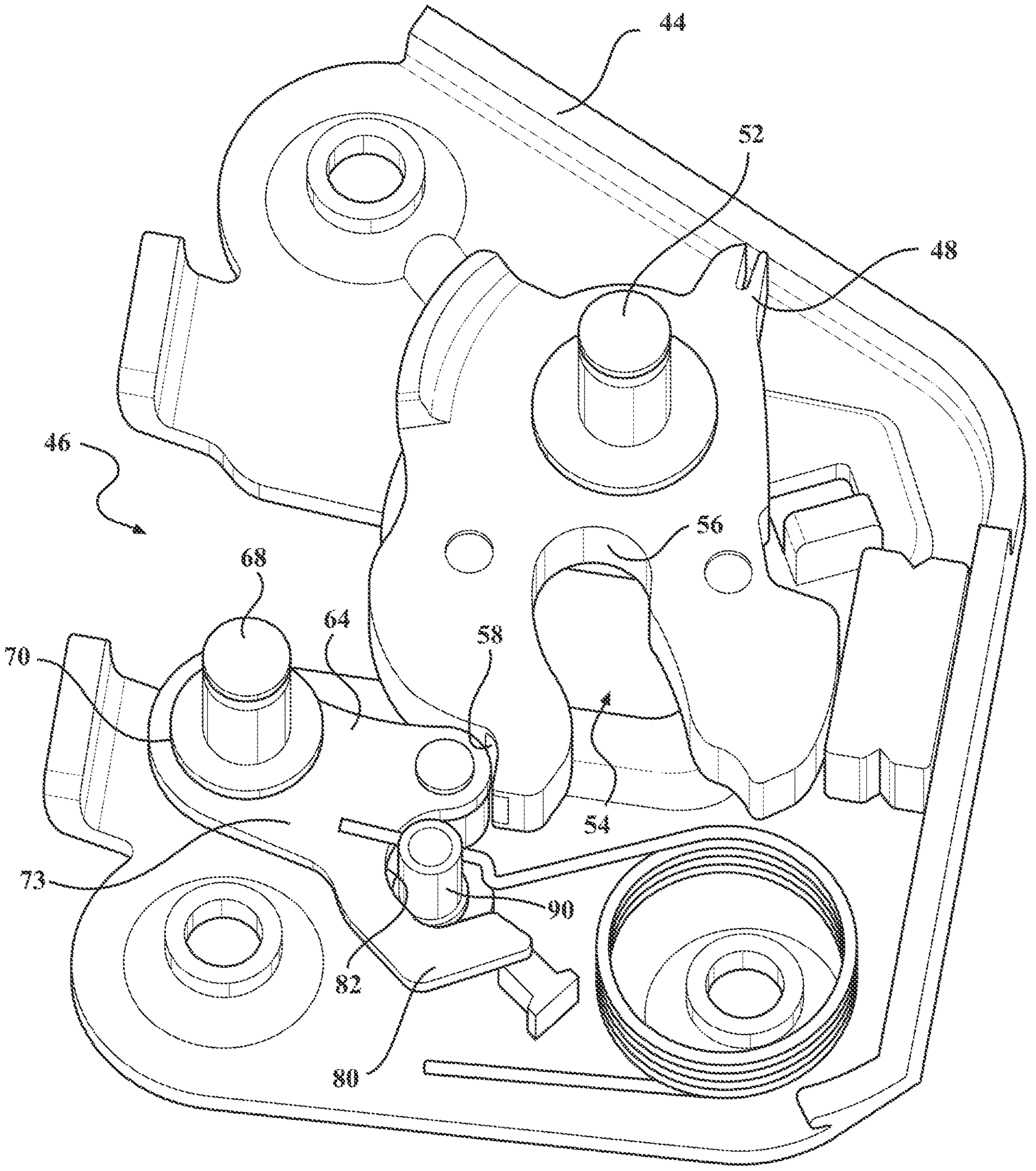
FIG. 4 is a view similar to FIG. 3 with various components removed for clarity of an interaction between a ratchet and a pawl assembly constructed in accordance with one aspect of the disclosure.

Frame plate 42 is a rigid component, shown in the non-limiting embodiment as being configured to be fixedly secured to edge portion of vehicle door 16 and which defines an entry aperture 46, sometimes referred to as fishmouth, through which striker 20 travels upon movement of vehicle door 16 relative to vehicle body 12. Latch mechanism 19 is shown, in this non-limiting example, as having a single ratchet and pawl arrangement including a ratchet 48 and pawl 50. Ratchet 48 is supported for rotational movement relative to frame plate 42 via a ratchet pivot pin 52. Ratchet 48 is configured to include a contoured guide channel 54 which terminates in a striker capture pocket 56, and a closing surface, also referred to as a closing notch 58. A ratchet biasing member, schematically shown in FIG. 2 by arrow 60, is adapted to normally bias ratchet 48 to rotate about ratchet pivot pin 52 in a first, opening or "releasing" direction (i.e. counterclockwise in FIG. 2).

Movement of the closure panel 16 (e.g. between the open and closed panel positions) can be electronically and/or manually operated by a latch controller 62, where power assisted closure panels 16 can be found on minivans, high-end cars, or sport utility vehicles (SUVs) and the like. As such, it is recognized that movement of the closure panel 16 can be manual or power assisted (e.g. using electronic latch controller 62) during operation of the closure panel 16 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched).

Figure 5:
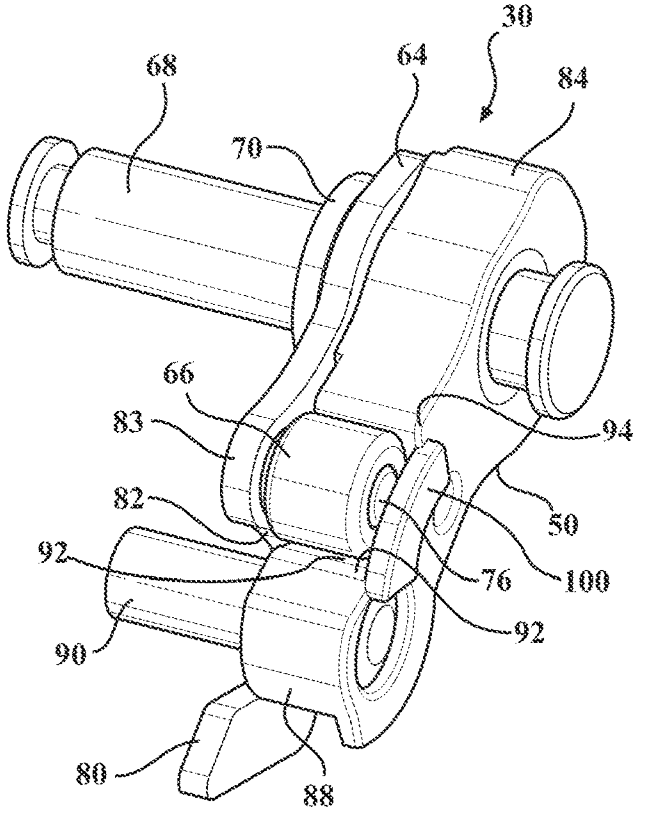
FIG. 5 is a perspective view of the pawl assembly of FIG. 4.
Figure 5A:
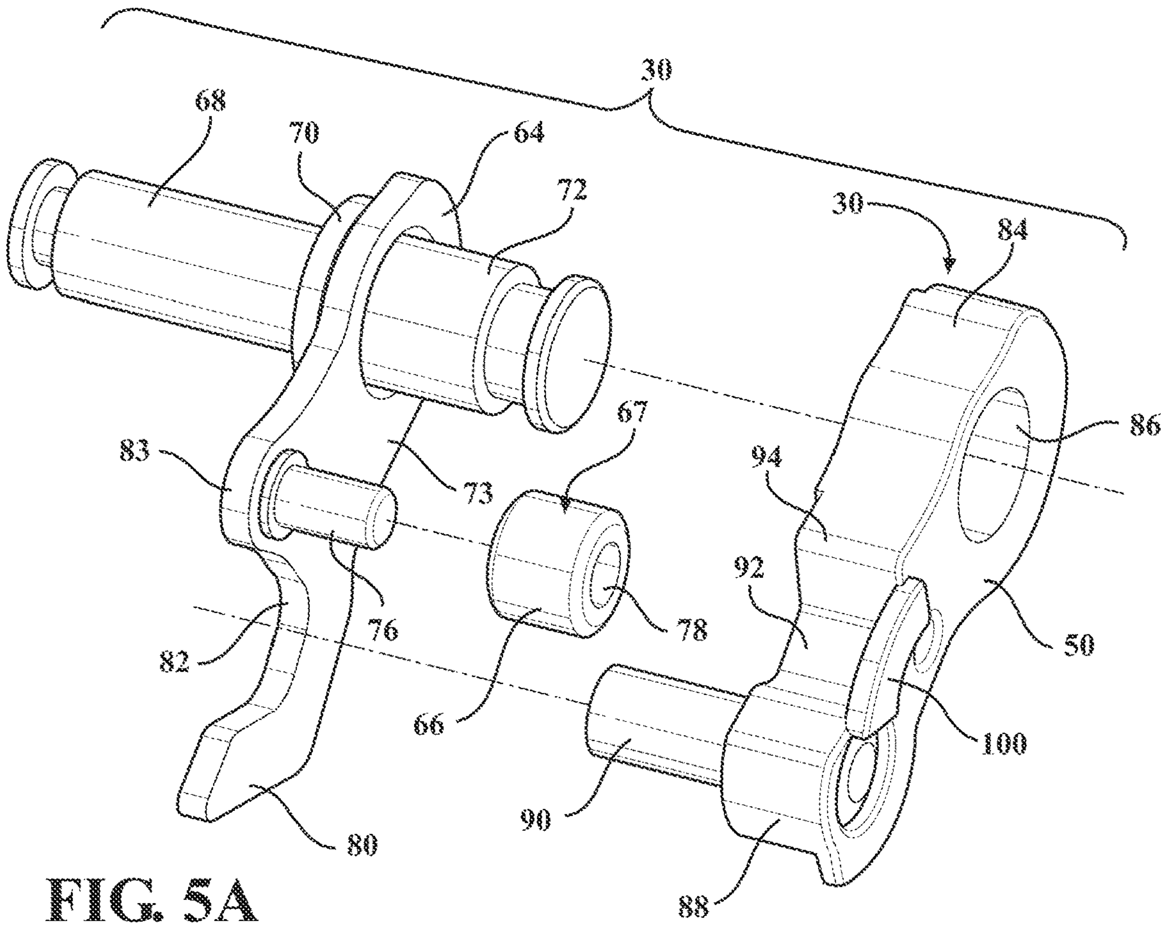
FIG. 5A is an exploded view of the pawl assembly of FIG. 5.

As best shown in FIGS. 5 and 5A, the pawl assembly 30 includes the pawl 50, a carrier member, also referred to as carrier plate, and referred to hereafter simply as carrier 64, a rolling member 66, referred to hereafter as roller 66, and a pawl support member 68, also referred to as pawl pin or pawl rivet 68. The pawl rivet 68 is fixed, such as to the frame plate 42, with carrier plate 64 and pawl 50 being configured for selective rotation about a central longitudinal axis A (FIG. 6) of the pawl rivet 68. The pawl rivet 68 has a radial shoulder, shown as an annular flange 70, extending radially outwardly from a cylindrical section 72. The cylindrical section 72 has a first diameter D1 (FIG. 6).

Figure 8:
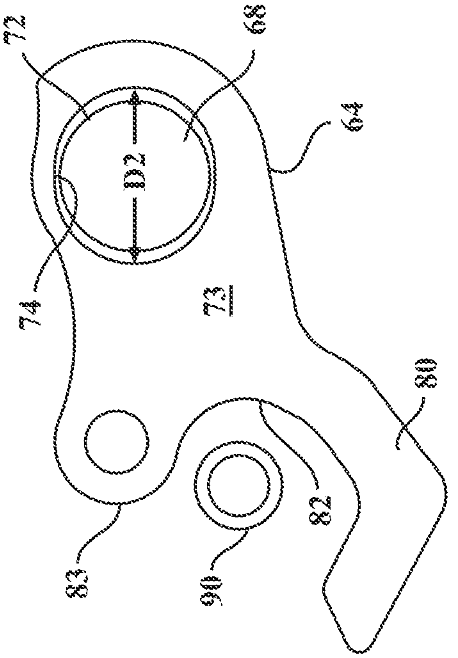
FIG. 8 is a fragmentary side view of the pawl assembly illustrating a pawl pin disposed with a pocket of a carrier of the pawl assembly.

The carrier 64, in a non-limiting embodiment, has a generally planar main body surface, referred to hereafter as body 73, with an oblong or elliptical through opening 74 sized for a clearance fit (FIGS. 6, 8) about cylindrical section 72 of pawl rivet 68. The clearance fit established between D1 and D2 inhibits radial loading between the pawl rivet 68 and carrier 64 during selective rotation of carrier 64 and pawl 50 about pawl rivet 68. The carrier 64 has a roller support member 76, referred to hereafter as roller pin or support pin 76, fixed thereto. Support pin 76 extends outwardly in cantilevered fashion from the generally planar body 73 in parallel relation with the central longitudinal axis A of the pawl rivet 68. Support pin 76 is configured for receipt of roller 66 thereon, wherein support pin 76 is sized for a close, minimum play loose fit within a through bore 78 of roller 66, such that roller 66 is free to rotate about support pin 76. Roller 66 can be retained on support pin 76 via any suitable mechanism that retains the ability of roller 66 to rotate on support pin 76, such as a C-clip or other type of fastening device or mechanism, including plastically deforming an end portion of support pin 76 to capture the roller 66 between the upset end portion and flange 70, or otherwise. The carrier 64 further includes an elongate extension 80, also referred to as arm 80. Arm 80 extends outwardly from a main body of carrier 64 to form an arcuate pocket 82 recessed between arm 80 and a nose region of the body 73 fixed to support pin 76.

Figure 6:
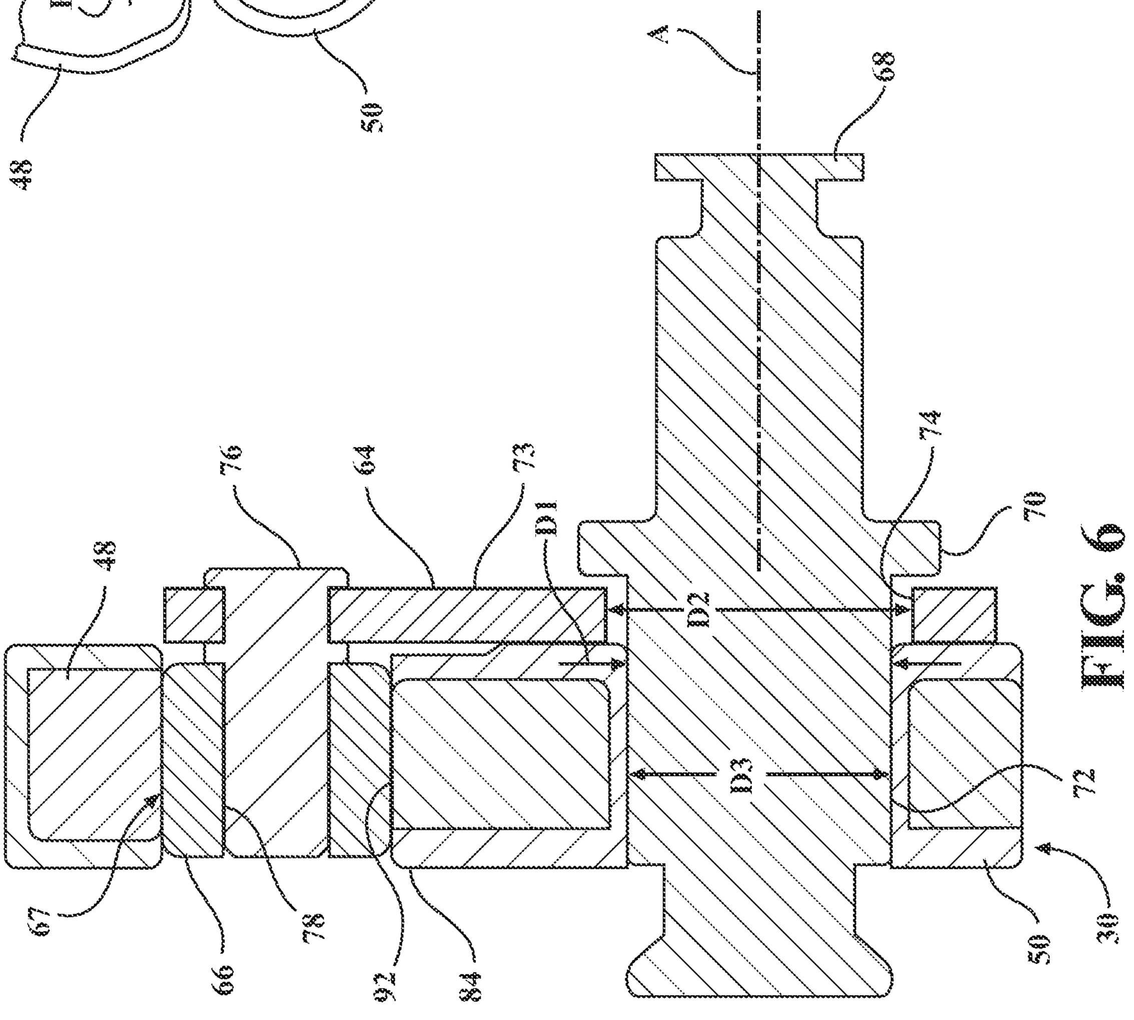
FIG. 6 is a cross-sectional view taken through a pawl rivet of the pawl assembly of FIG. 5 with the pawl assembly shown engaged with the ratchet of FIG. 4.

The pawl 50 has a first end region 84 with a through opening 86 having a third diameter D3 sized for receipt of cylindrical section 72 therethrough (FIG. 6). The through opening 86 is sized for a close, minimum play loose fit of cylindrical section 72, such that pawl 50 is free to rotate in a close fit about support pin 76. Carrier 64 is captured on cylindrical section 72 between the first end region 84 and flange 70. The pawl 50 has a second end region 88 opposite the first end region 84. A pawl pin 90 is fixed to pawl 50 and extends outwardly from second end region 88, wherein pawl pin 90 extends parallel with axis A of pawl rivet 68 upon pawl 50 being disposed on pawl rivet 68. Pawl pin 90 is disposed through the pocket 82 of carrier 64 (best shown in FIG. 8), wherein a predetermined degree of pivotal rotation of pawl pin 90 within pocket 82 is provided, such as between about 5-15 degrees, and in one non-limiting embodiment, about 10 degrees of relative pivotal rotation between pawl 50 and carrier 64 is provided, by way of example and without limitation. Pawl 50 has an arcuate recessed pocket 92 adjacent the second end region 88. Recessed pocket 92 is contoured for close mating receipt of roller 66 therein, and is delimited on one side by a raised lip or shoulder 94. Pawl 50 further includes a retaining barrier 100 to ensure that the roller 66 is retained on the pin 76. Illustratively the retaining barrier 100 is shown as a bridge element extending across the arcuate recessed pocket 92 adjacent the second end region 88 on one side of the pawl 50. The retaining barrier 100 can be formed as a monolithic piece of material with the pawl 50, or as a separate piece of material that is subsequently fixed to the material of the pawl 50 via any desired fixation mechanism, e.g., weld joint, adhesive or otherwise.

Figure 10A:
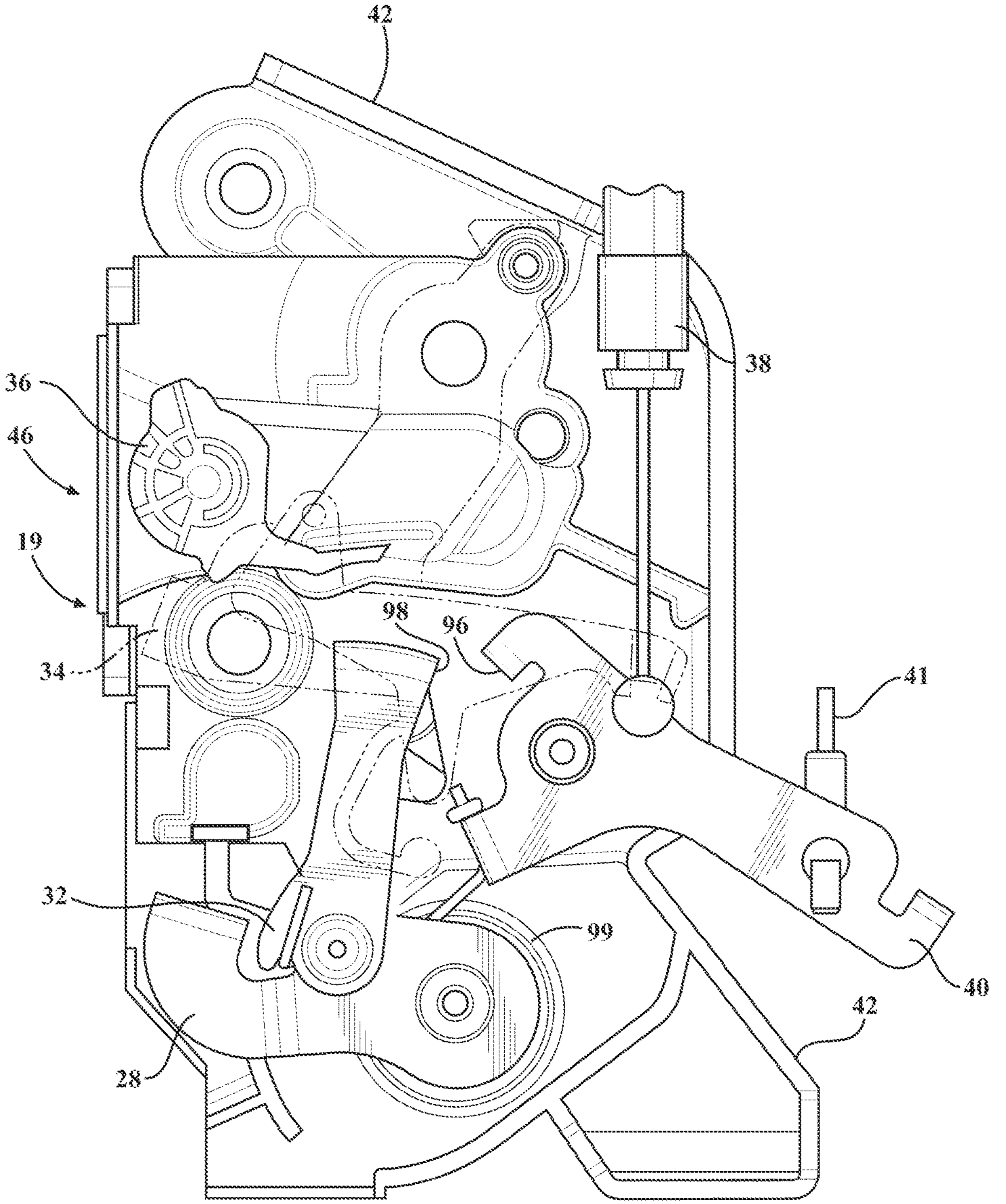
FIG. 10A is similar to FIG. 3 with a lock lever removed to better illustrate a release link while in a locked position with respect to an outside release lever.
Figures 1, 10A:
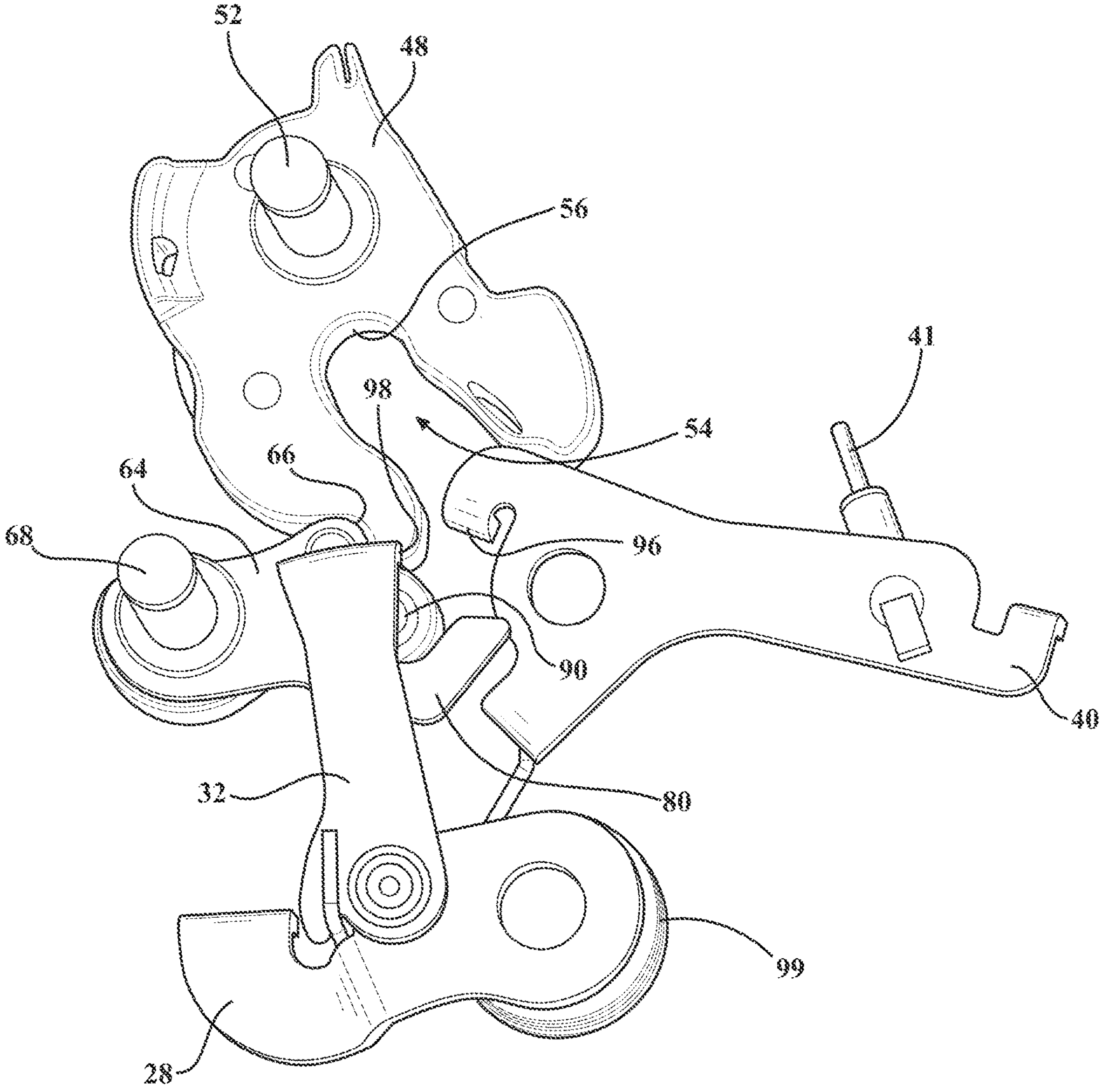
Figure 10B:
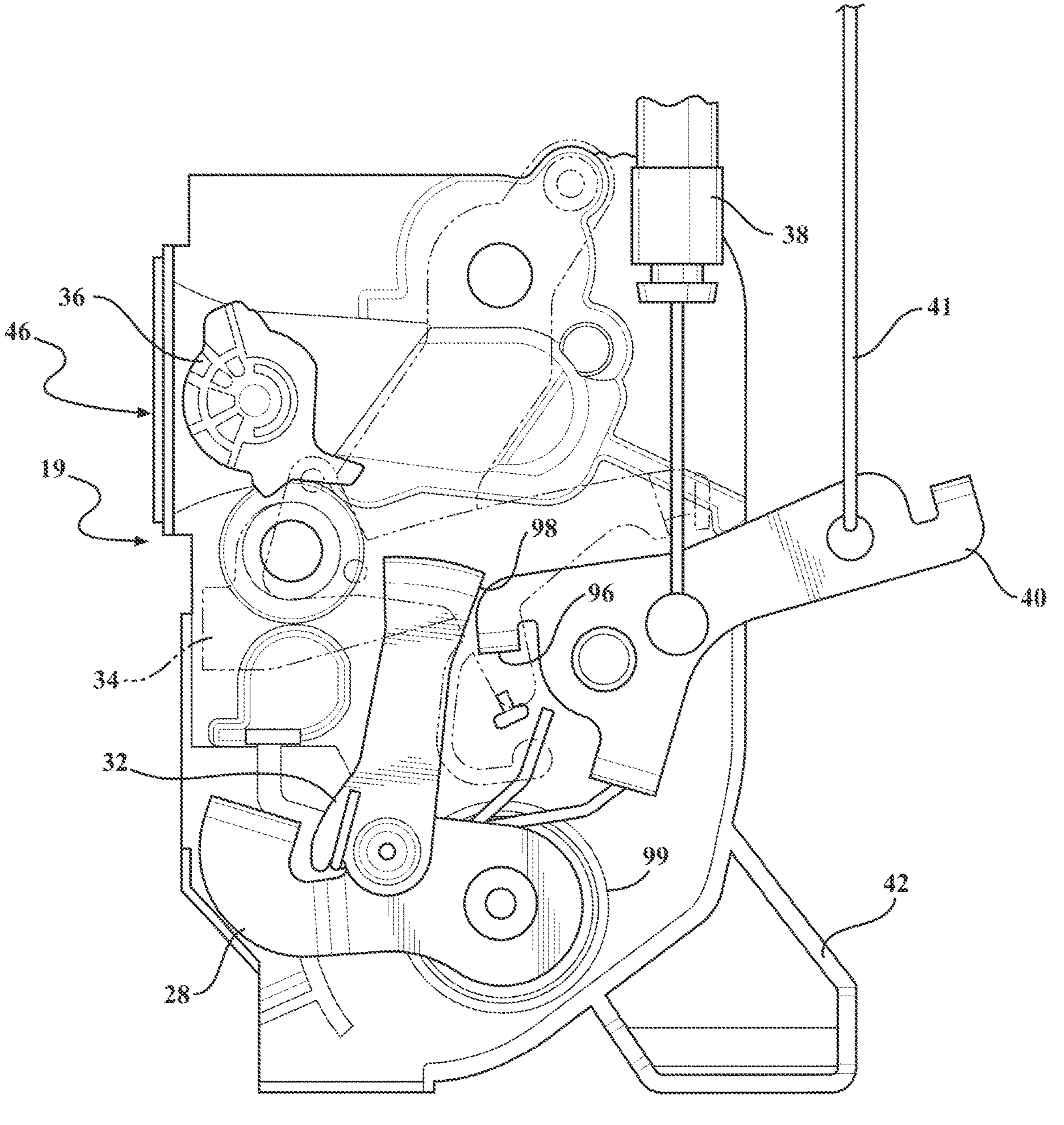
FIG. 10B is a view similar to FIG. 10A illustrating the outside release lever in an actuated position and in disengaged relation with the release link.
Figures 1, 10B:
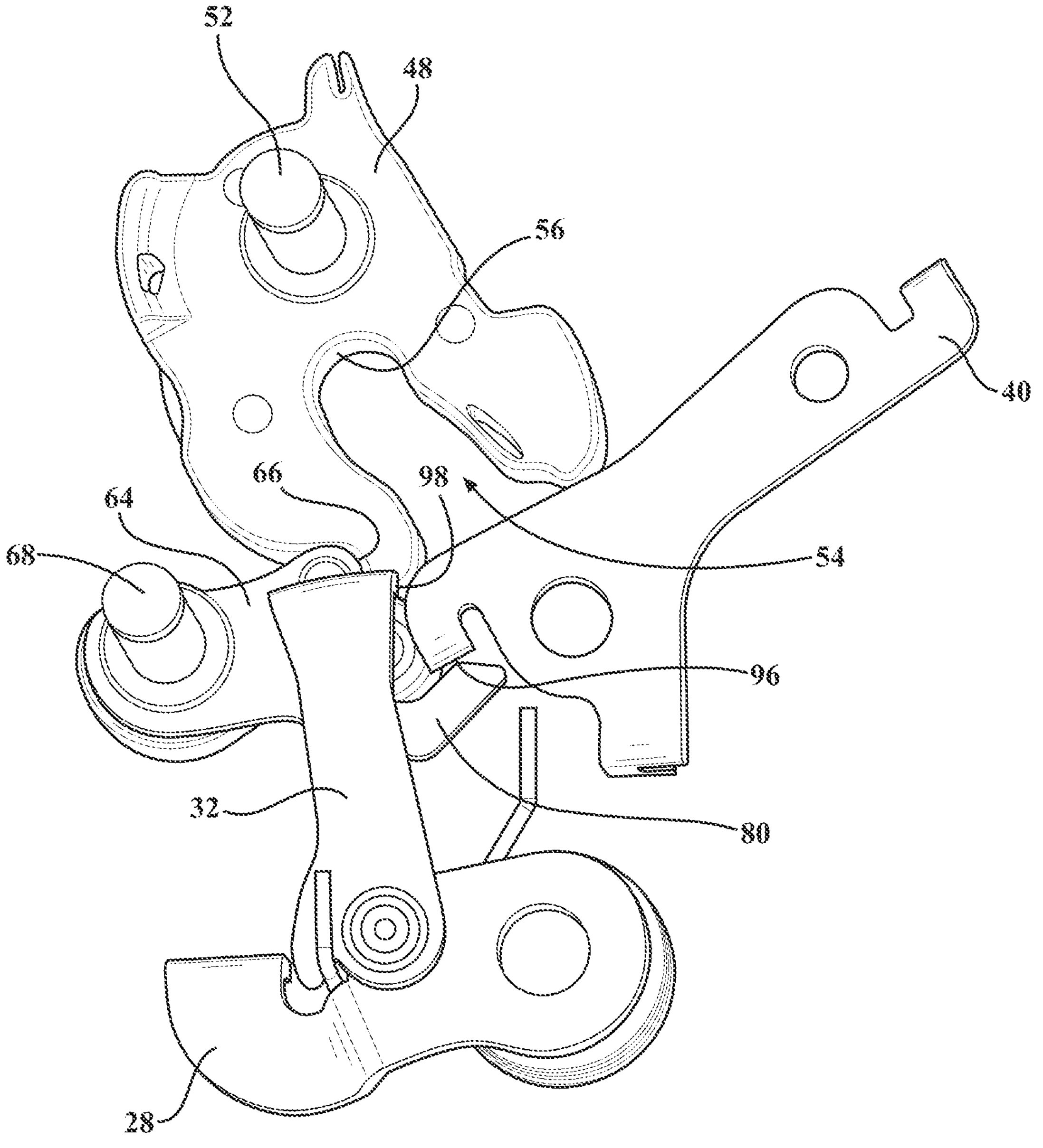
Figure 12A:
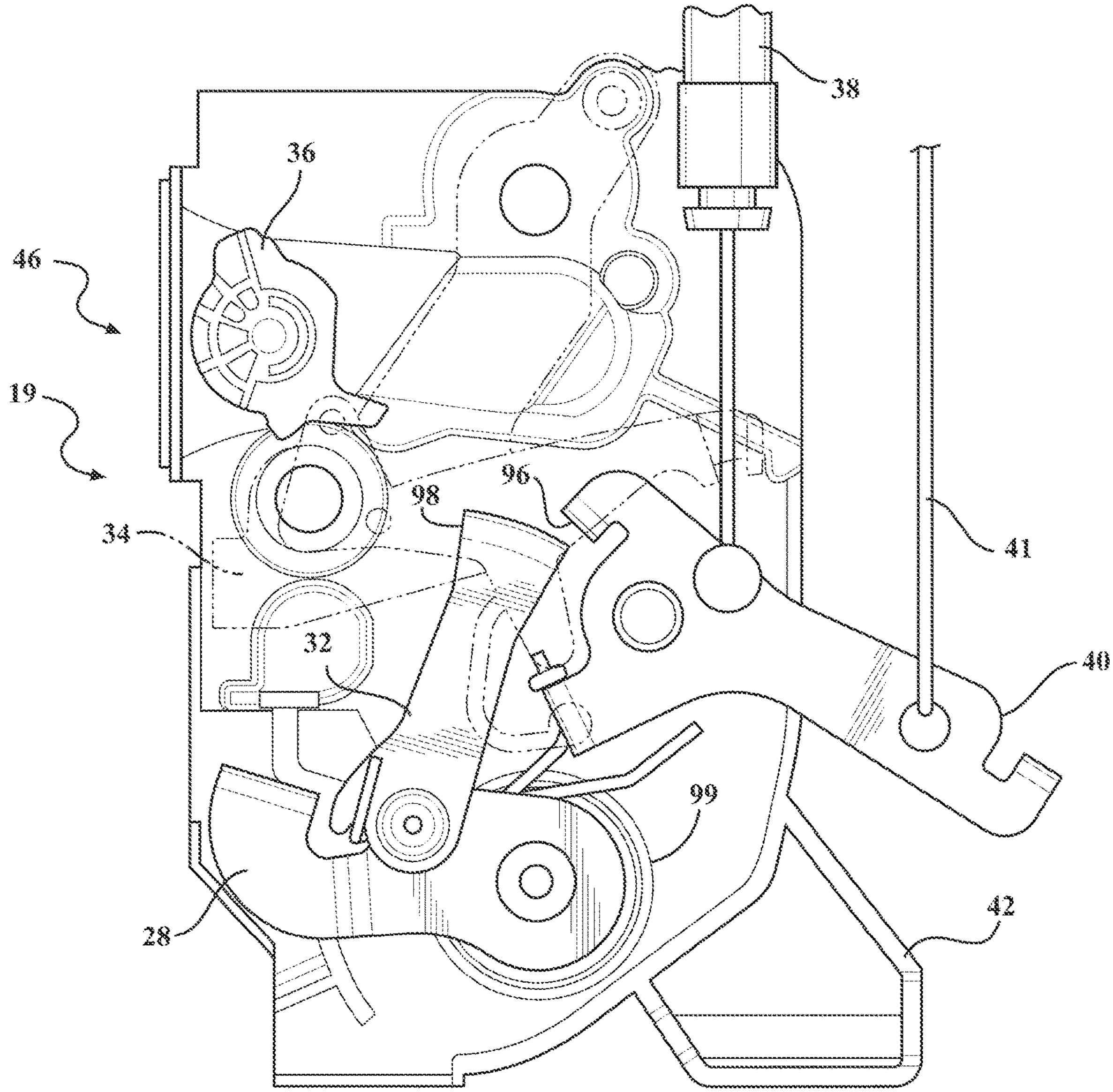
FIG. 12A illustrates the lock lever and release link in an unlocked position with the outside release lever in a non-actuated position.
Figures 1, 12A:
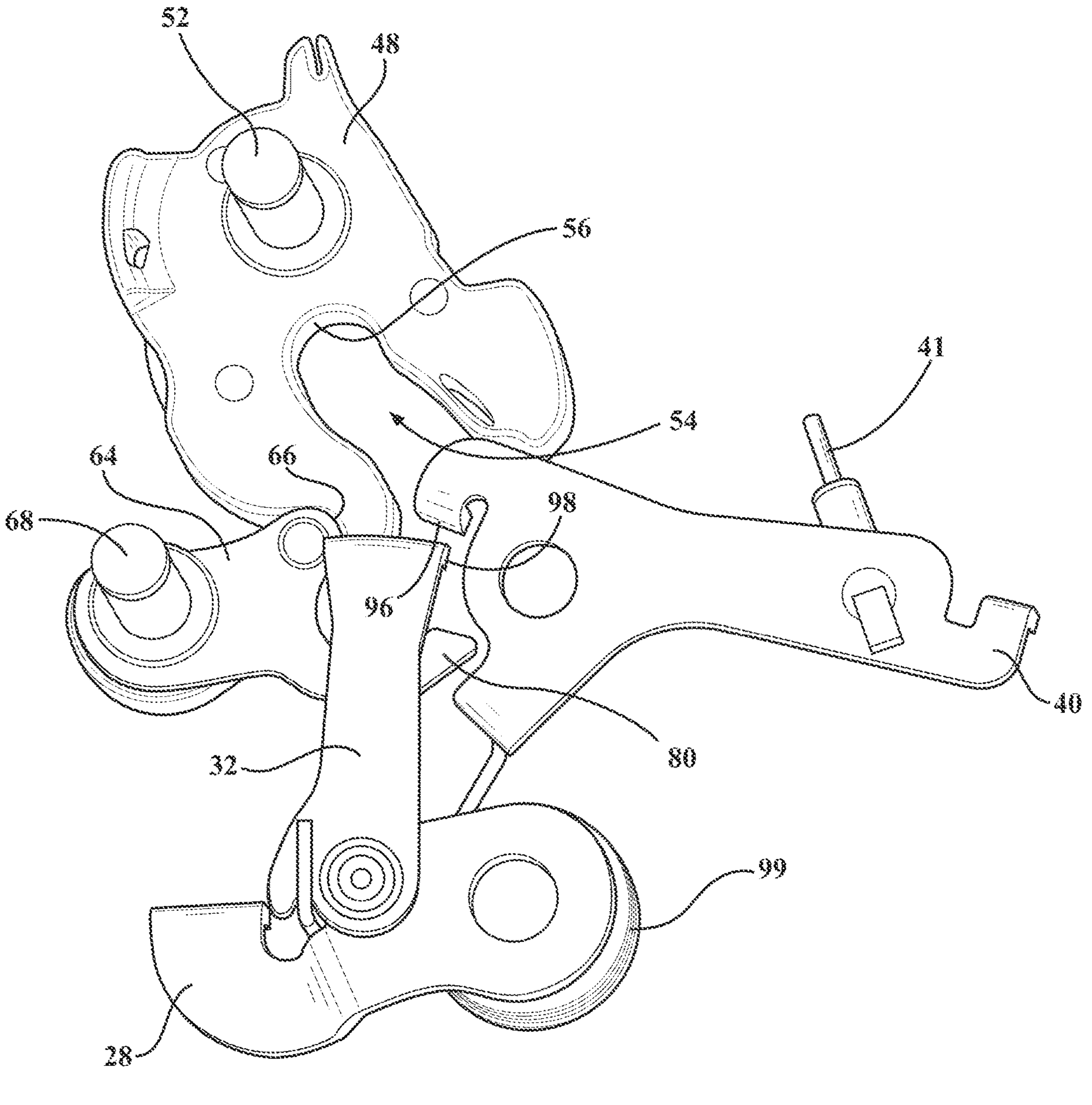
Figure 12B:
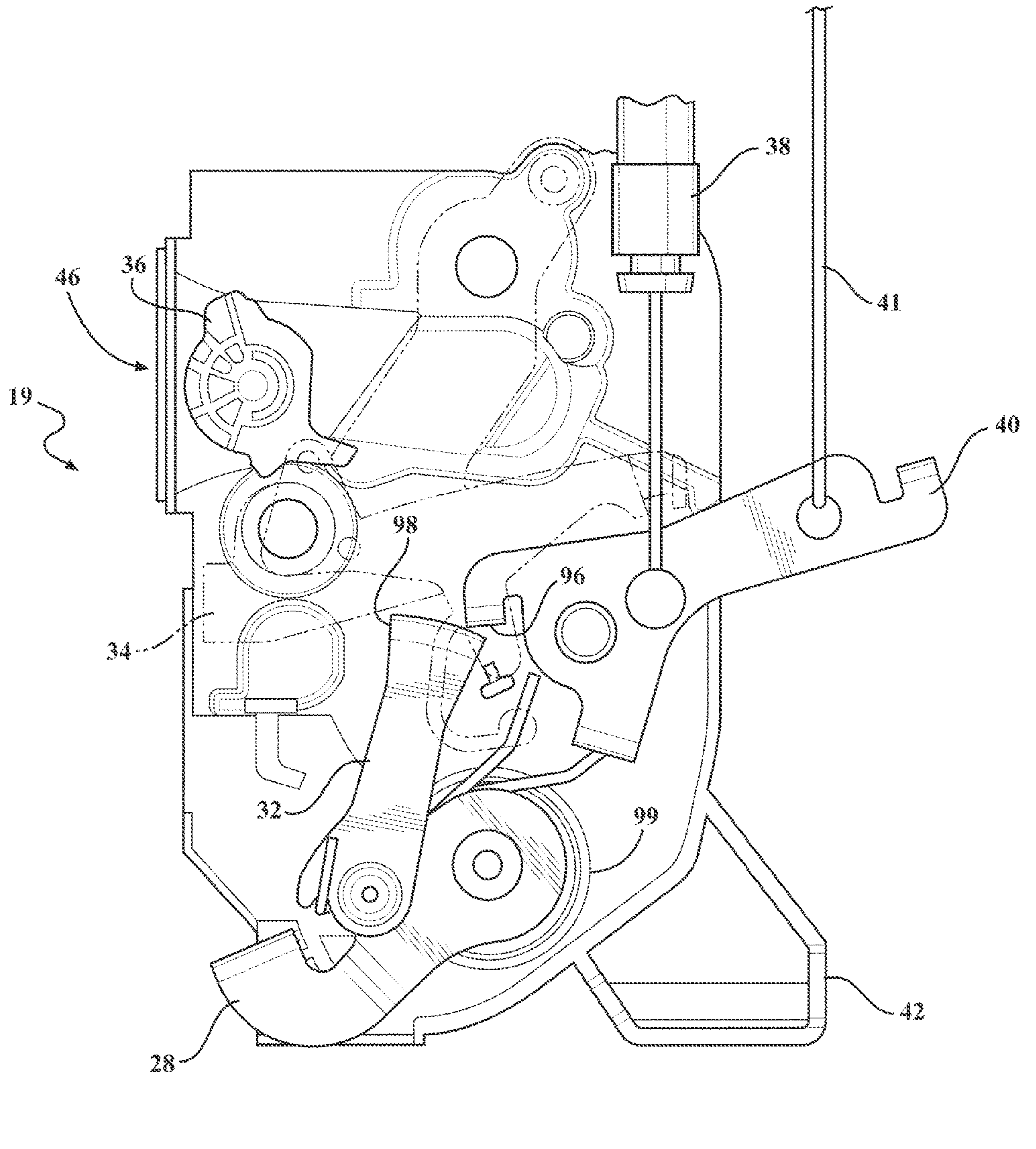
FIG. 12B illustrates the release link and release lever biased to an actuated state in response to movement of the outside release lever to an actuated position.
Figures 1, 12B:
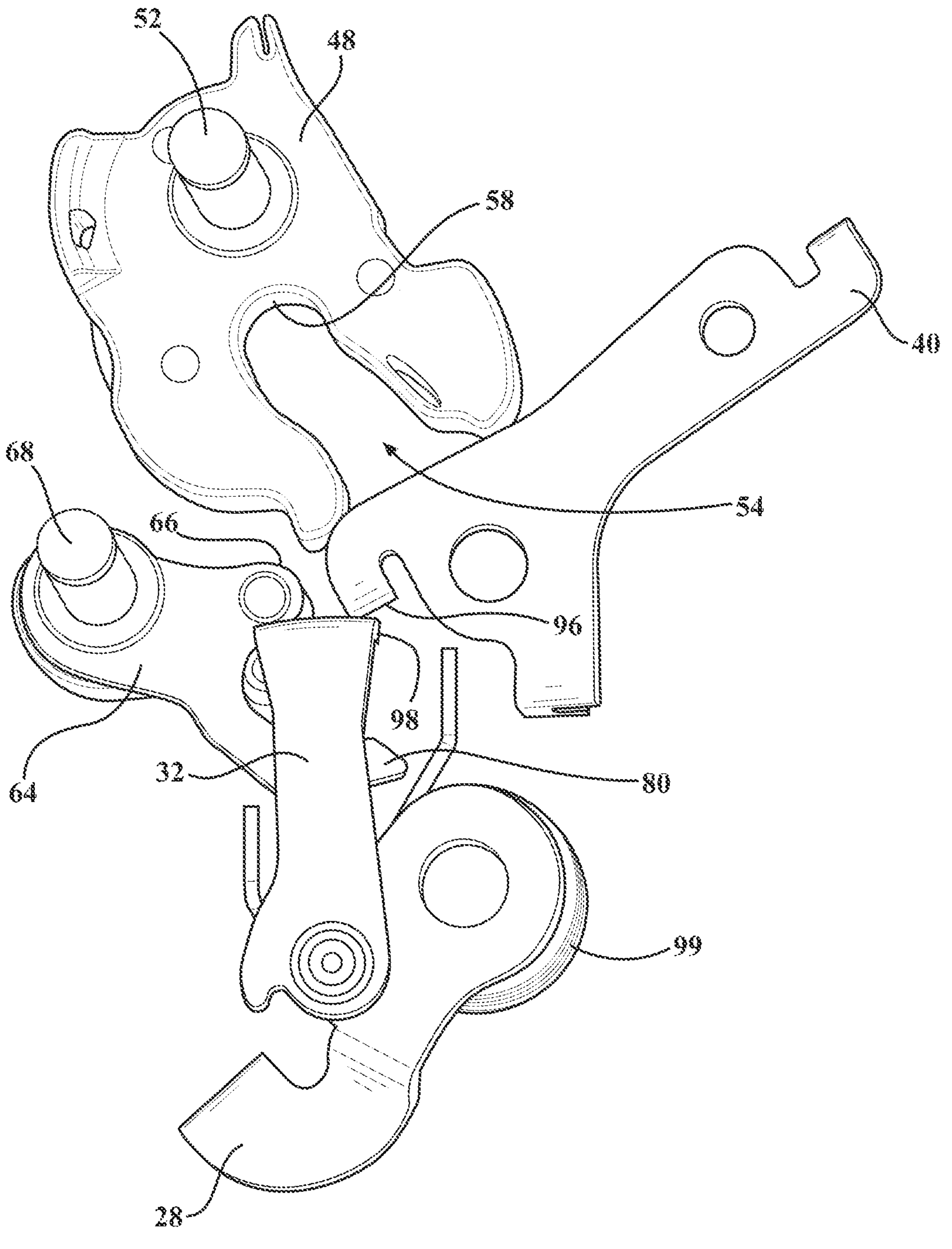

Latch mechanism 19 can be maintained in a locked/latched state or position, such as shown in FIGS. 10A-10B, and in an unlocked state or position, such as shown in FIGS. 12A-12B. While in the locked state, the outside release lever 40 is maintained out of reach of release lever link 32, and thus, any movement imparted on the outside release lever 40 via actuation of outside handle 22 does not result in movement of release link lever 32, and thus, the latch mechanism 19 remains in the latched state. The emergency lock knob 36 and key unlock cable 38 can be actuated to alter the locked/unlocked position of the latch mechanism 19. The emergency lock knob 36 can be accessed and utilized when the swing door 16 is in an open position, wherein a suitable key can be used to rotate the emergency lock knob 36 to move the lock lever 34 and release link lever 32 to their locked positions. This may be desirable if the swing door 16 is open and the power to the closure latch assembly 18 is interrupted, and wherein it is desired to have the swing door 16 in a locked state.

The roller 66 is shown as having a cylindrical outer surface 67 configured for rolling engagement with the corresponding surfaces of the ratchet 48 and pawl 50, though any desired contour shape of the outer surface 67 is contemplated herein. For example, the outer surface could be spherical, elliptical, or some other arcuate shape. Further, the outer surface could be textured (e.g. roughened), coated with a suitable bearing grade material, polished or otherwise. In addition, the roller 66 is shown as being a monolithic piece of material journaled directly on roller pin 76; however, it is contemplated that roller 66 could be provided as a roller bearing having a plurality of rolling elements, including balls, roller needles, or otherwise. A single rolling element, such as a sphere or ball as a non-limiting example only, may also be provided. Accordingly, any suitable low-friction bearing is contemplated herein.

Figure 9:
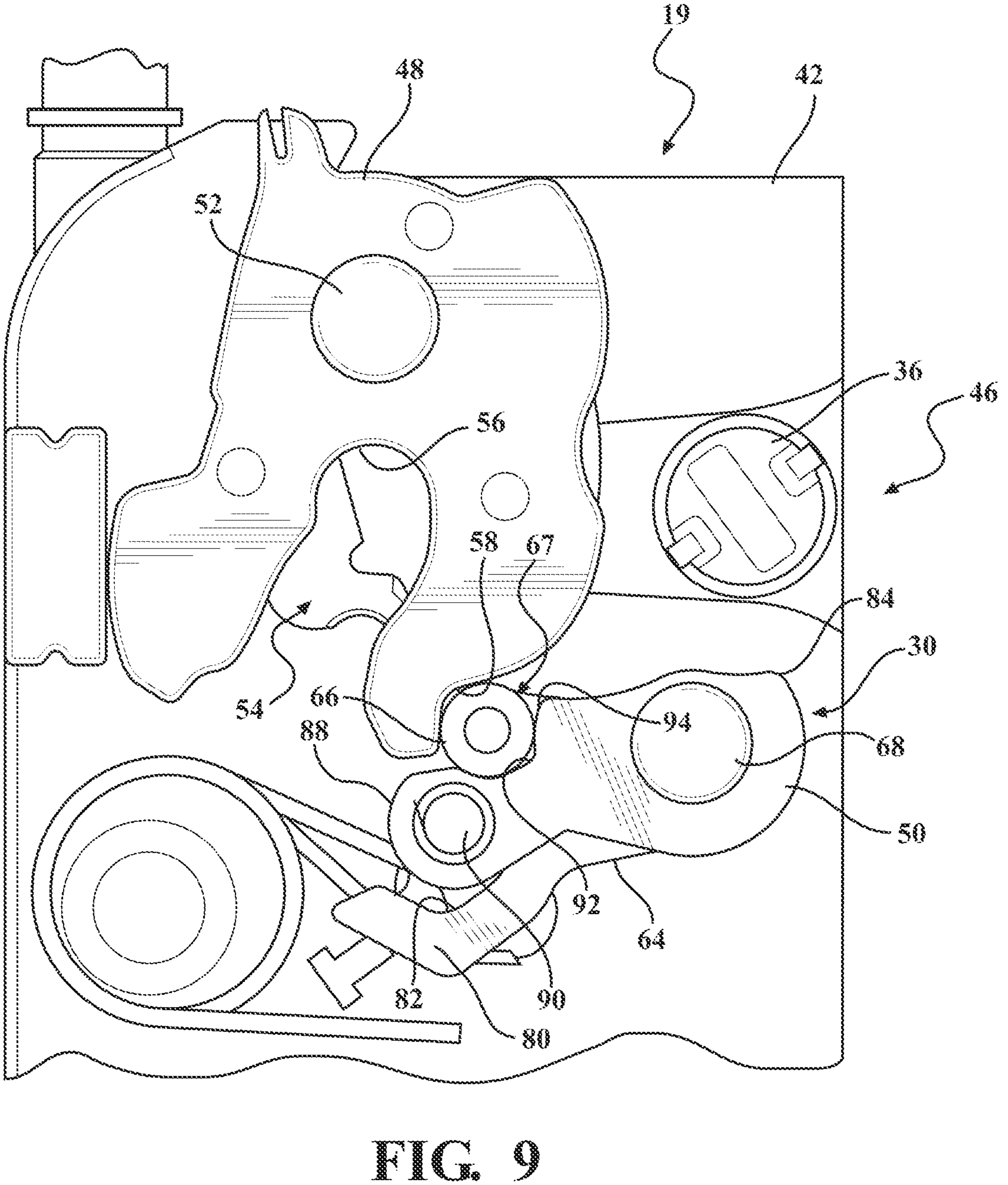
FIG. 9 is an enlarged fragmentary view of FIG. 2 with a cover plate removed illustrating the pawl assembly in a ratchet holding position.
Figure 9A:
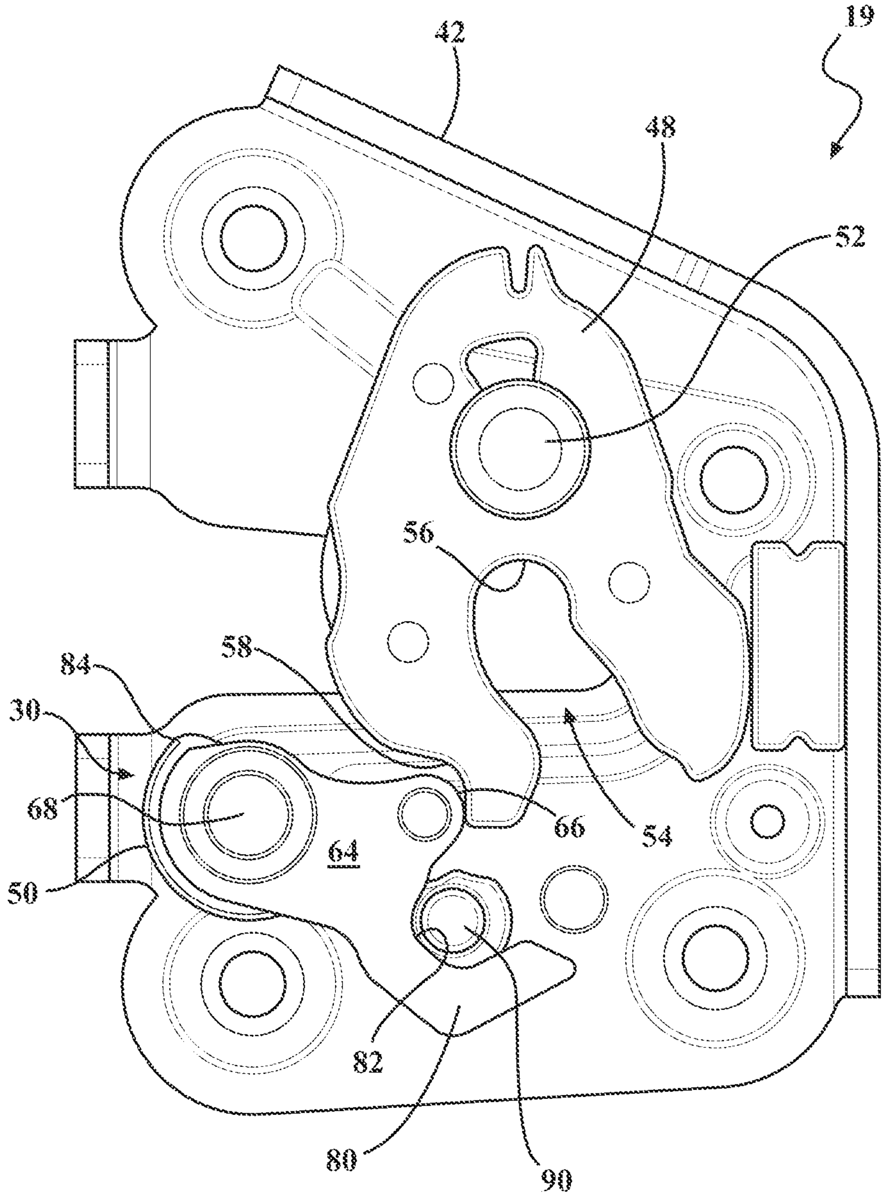
FIG. 9A is a back side view of the view of FIG. 9.
Figure 13:
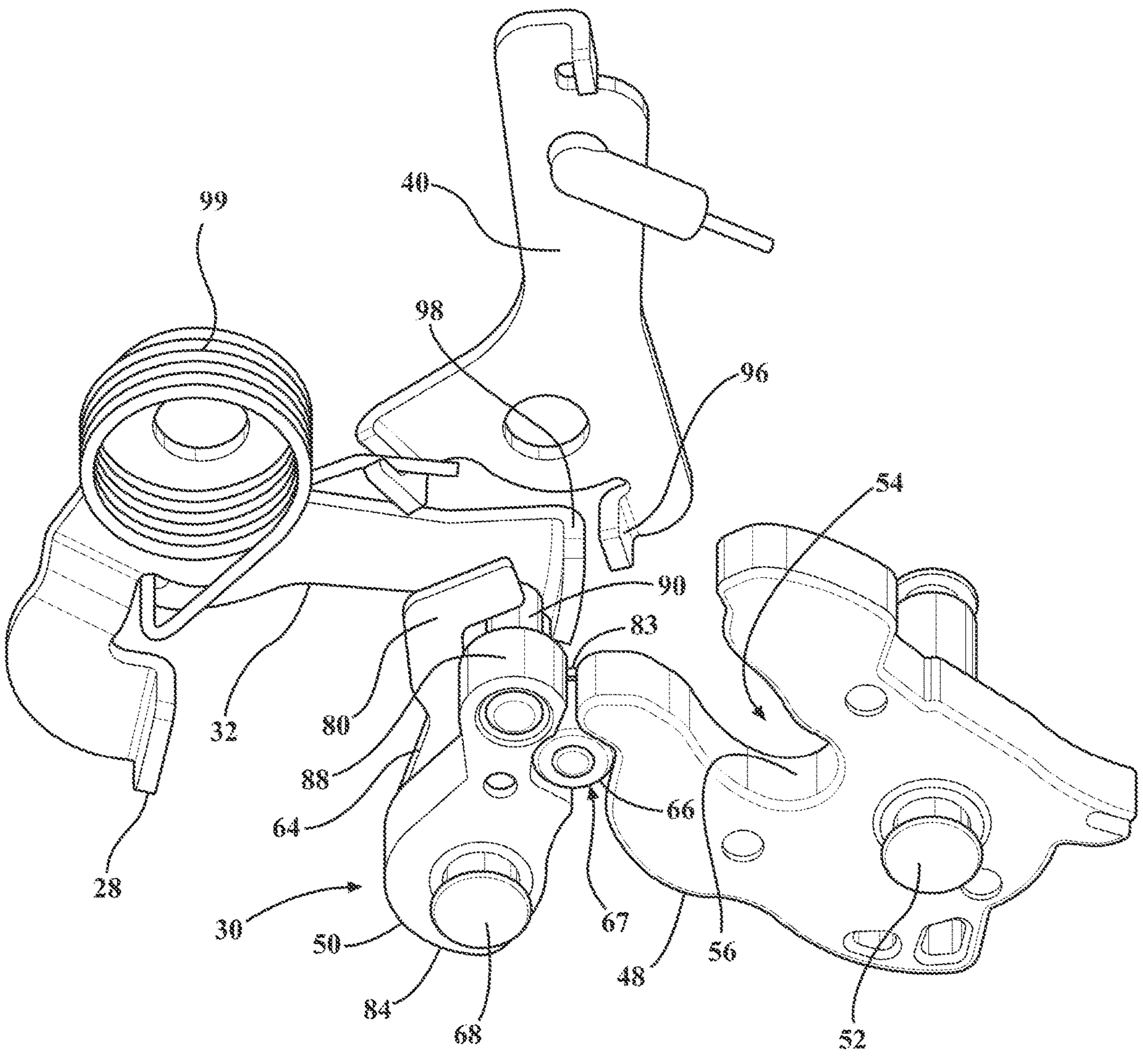
FIG. 13 is a fragmentary perspective view looking from a side opposite that of FIG. 12A illustrating various levers in relation with one another while the link lever is in an unlocked position as shown in FIG. 12A.

In use, when the swing door 16 is in a fully-closed position, the latch mechanism 19 is as appears in FIG. 9, with the roller 66 disposed in seated abutment with the closing notch 58 of ratchet 48 and in seated abutment with the pawl 50 within recessed pocket 92. When in the unlocked state, upon actuation outside release lever 40 (FIGS. 12A-12B), a tab 96 (FIG. 13) on outside release lever 40 is brought into engagement with a tab or lug 98 of release lever link 32, and as such, release lever link 32 is caused to be driven along with release lever 28 to rotate release lever 28 against a bias of a biasing spring member 199, wherein release lever 28 causes conjoint rotation of pawl 50. As the release link lever 32 is caused to be driven in an opening or unlatching direction either driven by actuation of the release lever 28 or actuation of the outside release lever 40, lug 98 will be driven into contact with the pawl pin 90 to impart a force to drive the rotation of the pawl 50 from its ratchet holding position to its ratchet releasing position as the release link lever 32 is being driven.

Figure 11A:
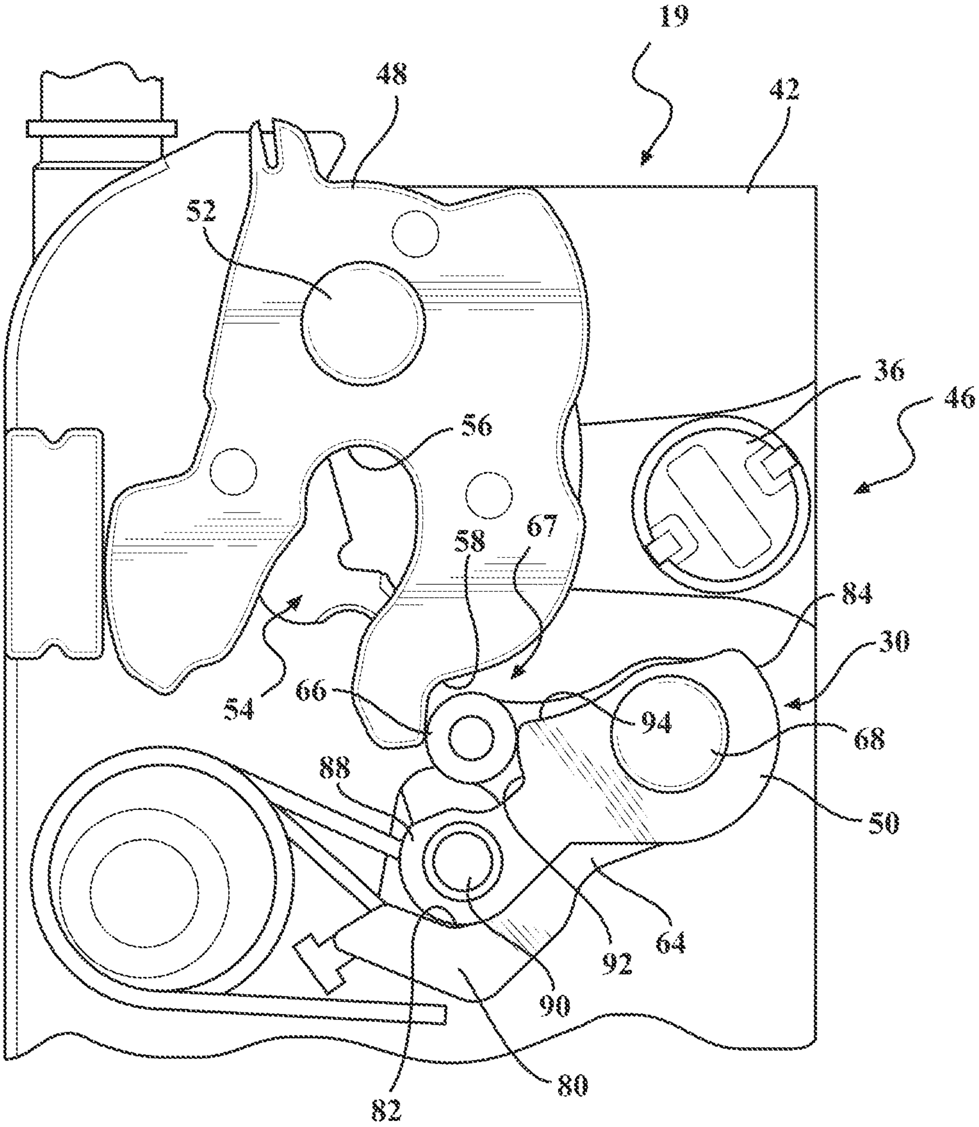
FIGS. 11A-11C illustrate the pawl assembly being progressively biased toward a ratchet releasing position in response to actuation of the outside release lever with the release link in an unlocked position as shown in FIGS. 12A-12B.
Figures 1, 11A:
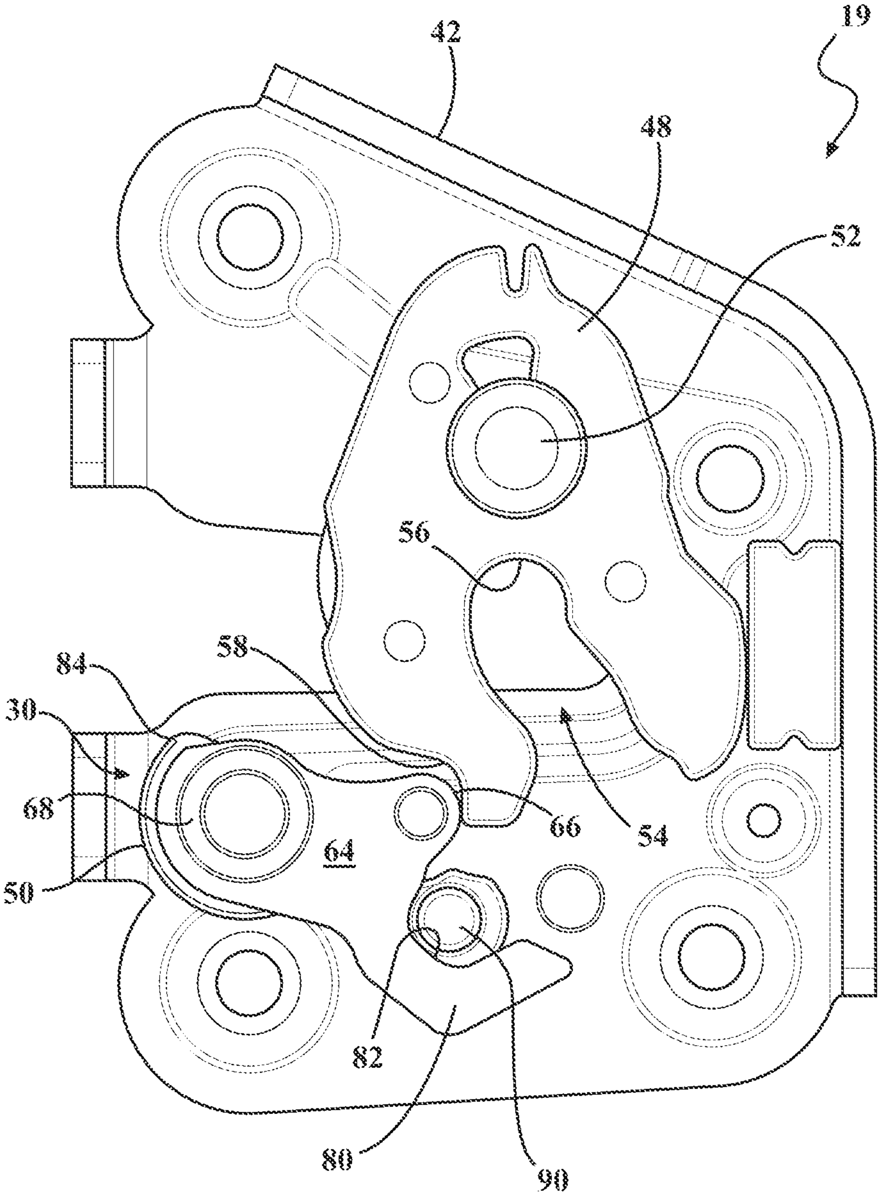
Figure 11B:
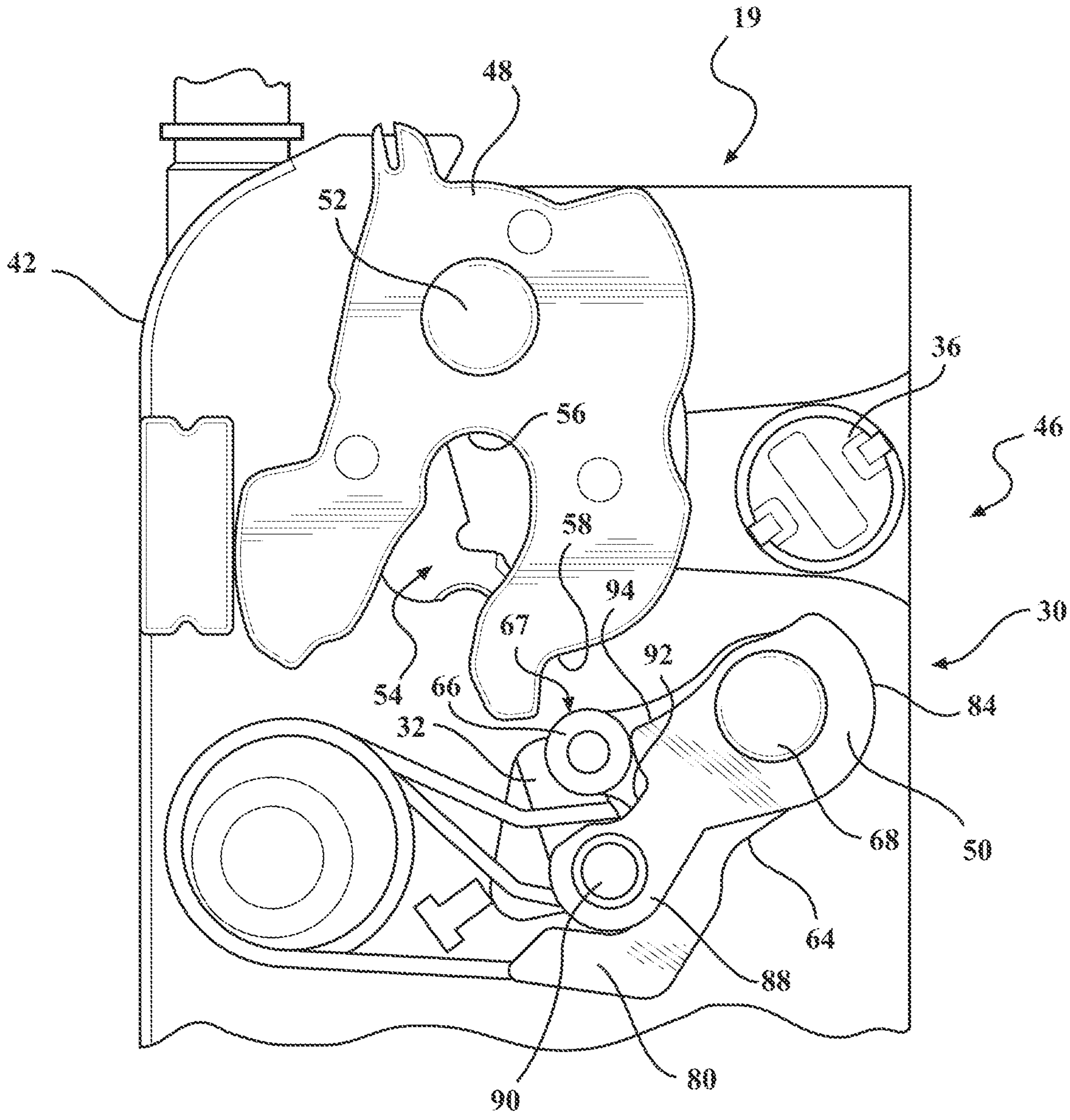
Figures 1, 11B:
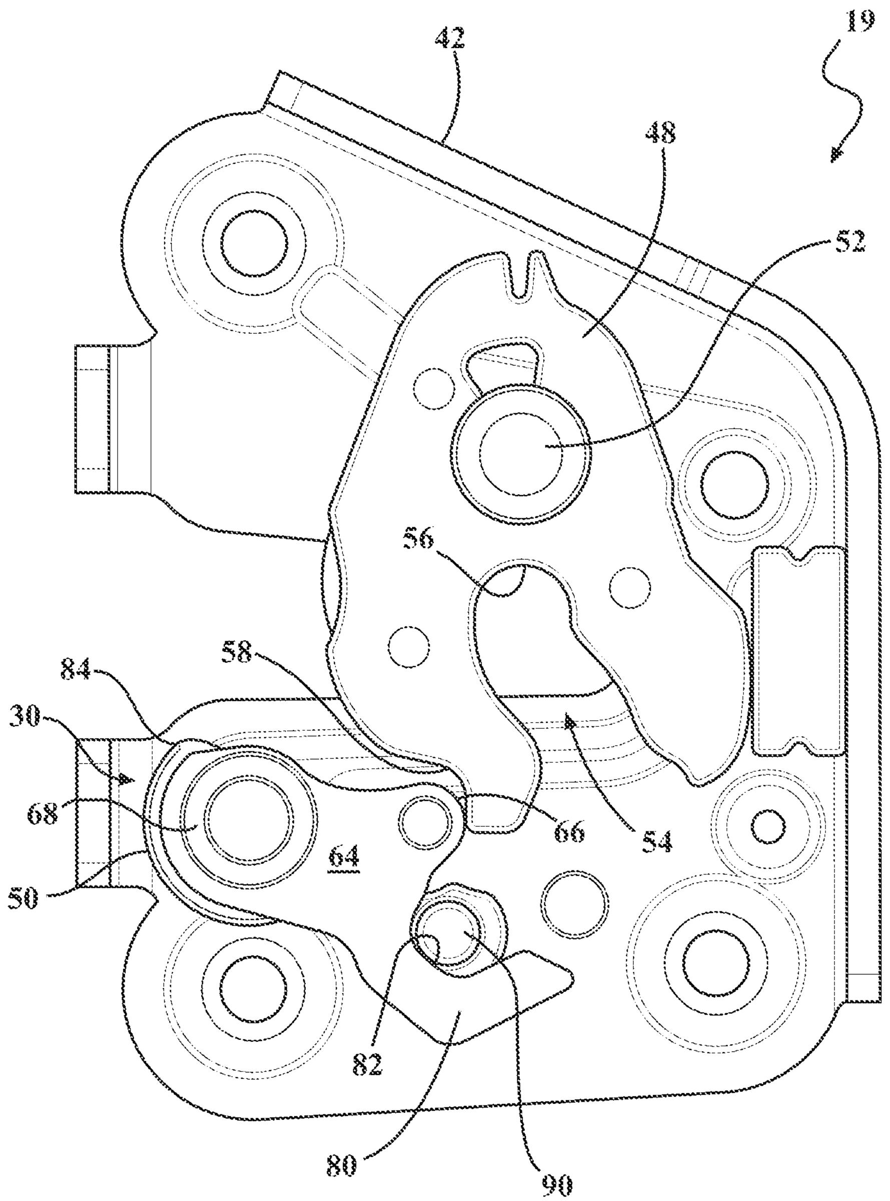
Figure 11C:
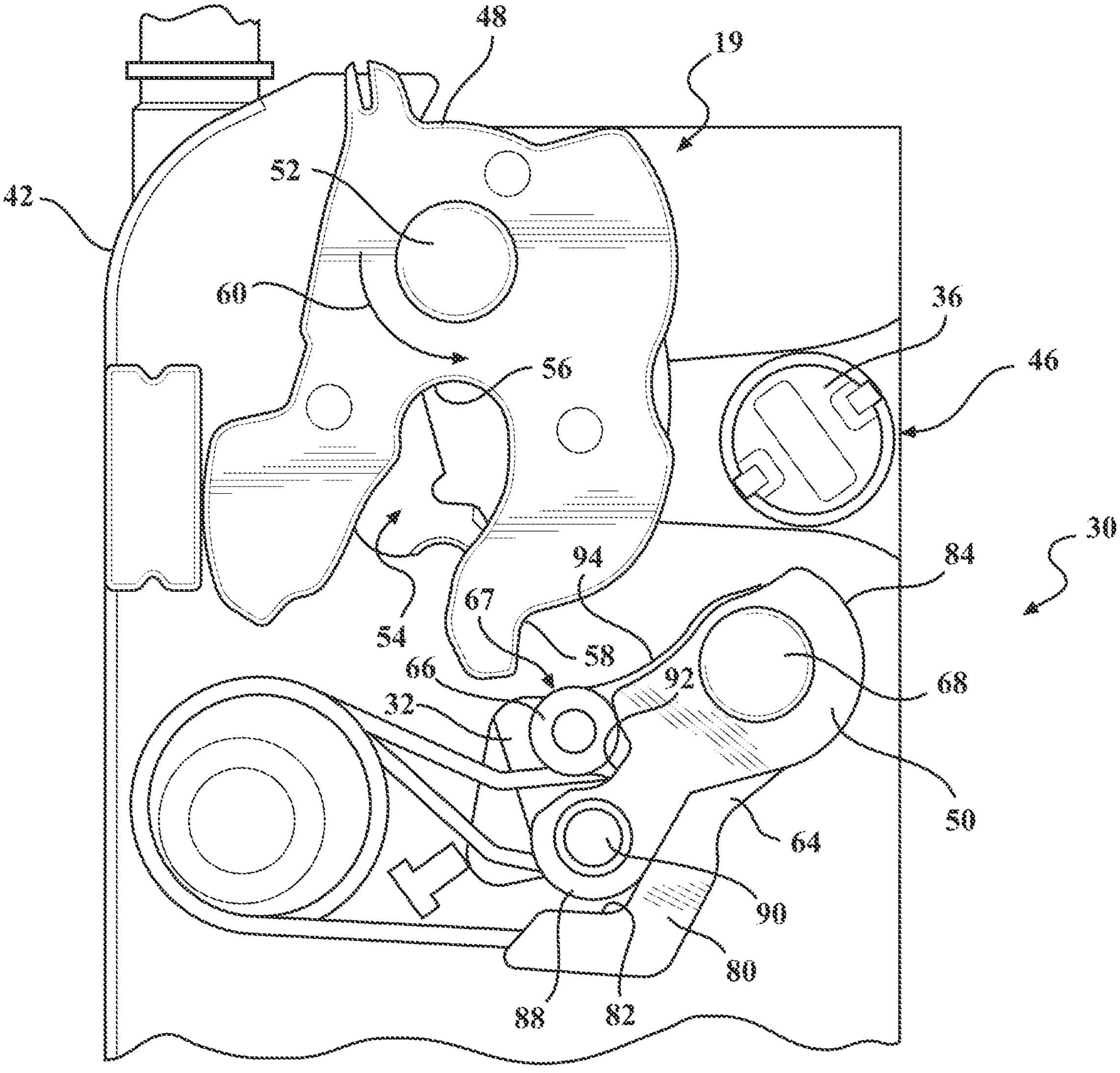
Figures 1, 11C:
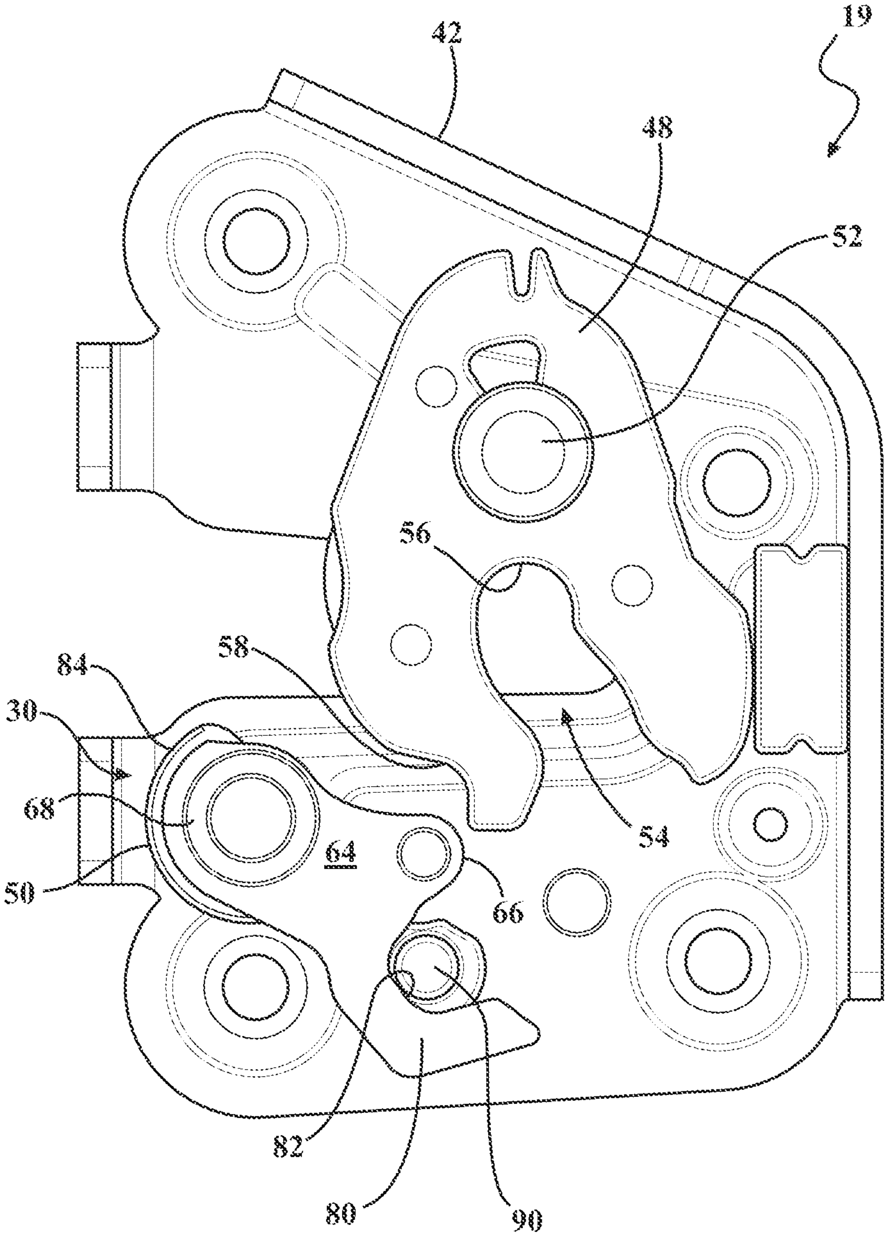

As pawl 50 is initially rotated under the bias of release lever 28, carrier 64 remains stationary or substantially stationary due to pawl pin 90 being free from contact with carrier 64 and due to the clearance fit between cylindrical section 72 of pawl rivet 68 and through opening 74 of carrier 64. A slight movement of the carrier 64 may be caused by the imparted movement to the roller 66 acting on the carrier 64 through the roller pin 76 as caused by the movement of the pawl 50 in the releasing direction relative to the ratchet 48, as illustratively shown in between FIG. 14A and FIG. 14B. The holding force applied by the pawl 50 on the ratchet 48 thus is transferred through the body of the roller 66. As such, the loading between ratchet 48 and pawl 50 during relative rotation between ratchet 48 and pawl 50 is solely through cantilevered roller 66 and the pure rolling motion of roller 66. With the rolling motion of roller 66 being pure rolling motion, no sliding friction is generated between ratchet 48 and roller 66 nor between pawl 50 and roller 66. Accordingly, minimal force is required to actuate movement of pawl 50 from its ratchet holding position toward and ultimately to its ratchet releasing position. As actuation progresses, and as pawl 50 continues to rotate away from the ratchet holding position as caused by the continued motion of the release lever 28 acting on the pawl pin 90, pawl pin 90 rotates freely within pocket 82 of carrier 64 between nose region 83 and arm 80 without contacting carrier 64, at least initially and while roller 66 is in rolling contact with ratchet 48 and pawl 50. At a point before the roller 66 leaves rolling contact with the closing notch 58, the forces between the pawl 50 and the ratchet 48 may be such as to impart an opposite rotation on the roller 66 tending to cause the roller 66 to remain pinned between the ratchet 48 and the pawl 50. To ensure that roller 66 leaves rolling contact with closing notch 58 of ratchet 48 and adjacent shoulder 94 of pawl 50, pawl pin 90 may enter into contact with arm 80 of carrier 64 to cause carrier 64 to rotate with pawl 50 (FIG. 11A) and ensure that the roller 66 leaves rolling contact with the closing notch 58. Rotation of pawl 50 and carrier 64 continue, as shown in FIGS. 11B-11C, to a full open position, whereupon ratchet 48 is free to rotate to the open position under the bias of ratchet biasing member 60. During such rolling release of the roller 66, the loads acting between the ratchet 48 and the pawl 50 may be unbalanced due to the changing orientation of the roller 66 as the pawl 50 is initially moved. Such unbalanced forces would result in a new force being transferred from the roller 66 through the roller pin 76 onwards through the carrier 64 and into the pawl rivet 68, adding extra stresses there to. In such a configuration, where there is not free play between the roller 66 and the pawl rivet 68, a counterforce experienced may lend to the roller 66 becoming jammed or pinned between the ratchet 48 and the pawl 50. The through opening 74 of carrier 64 therefore allows for the roller 66 to freely follow a path defined by the changing orientation of the pawl 50 relative to the ratchet 48 in the pawl releasing direction, and avoid net forces acting on the roller 66 to be transferred to the pawl rivet 68. As will be readily appreciated by one skilled in the art, latch mechanism 19 is automatically reset upon returning the swing door 16 to its closed position.

Figure 14A:
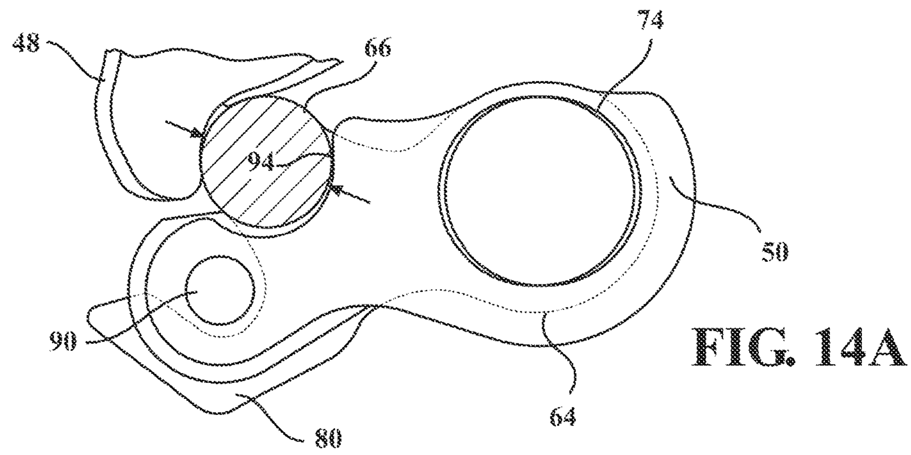
FIGS. 14A to 14C illustrated the force vectors and the net rotational forces acting upon the roller and carrier of the pawl assembly of FIG. 7.
Figure 14B:
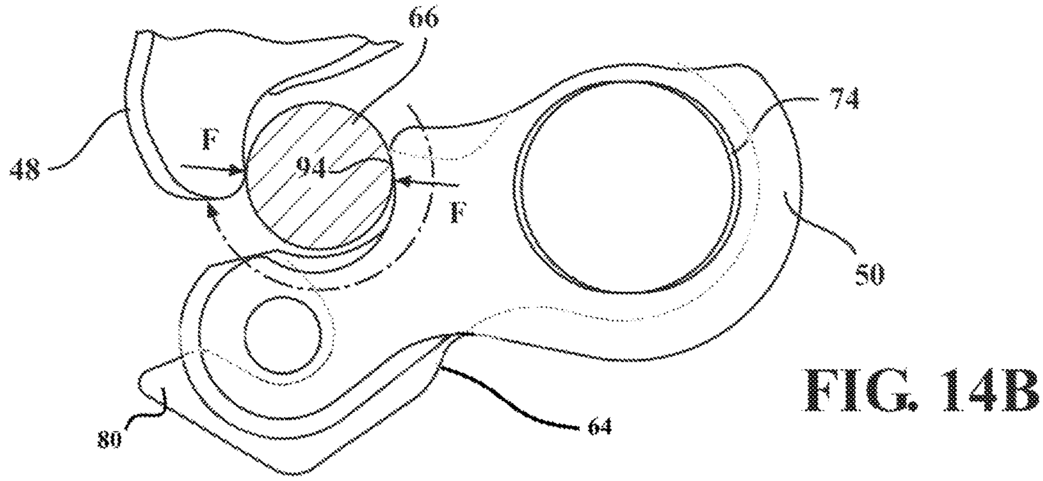
Figure 14C:
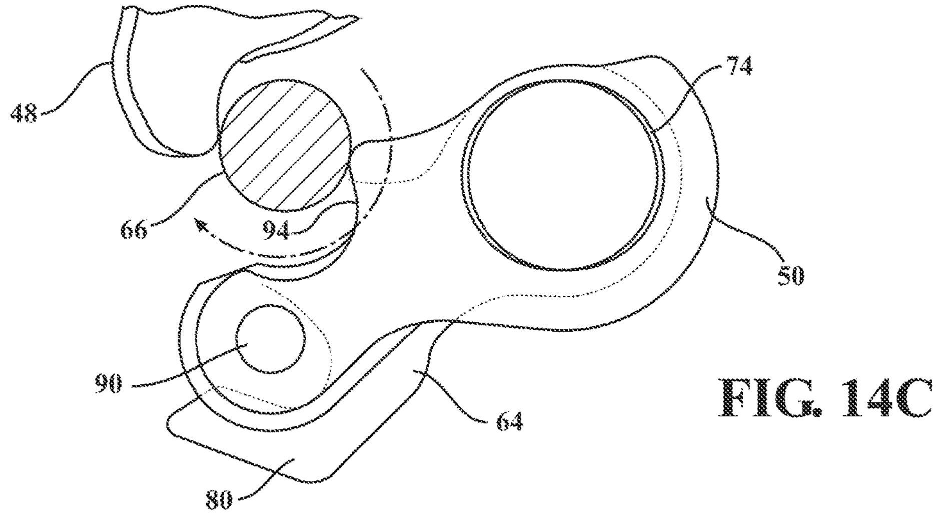

Now referring to FIG. 14A to 14C, there are shown the forces acting upon and the motion of the roller 66 as the pawl 50 is rotated towards its ratchet release position during a normal releasing operation. In FIG. 14A, the forces F acting upon the roller 66 are such that the roller 66 will not be urged to rotate in any significant direction. The pawl 50 has not been engaged to move to a ratchet releasing position. In FIG. 14B, the pawl 50 has been engaged to move to a ratchet releasing position and the movement of the recessed pocket 92, for example contact of now moving adjacent shoulder 94 with roller 66, will cause the roller 66 to roll relative thereto over a first stage of travel of the pawl 50, moving the roller 66 between the ratchet 48 and the pawl 50. This action will cause the roller 66 to rotate in a clockwise direction as shown. In FIG. 14C, the continued rotation of the pawl 50 towards the ratchet releasing position and the further movement of the recessed pocket 92 will cause the roller 66 to roll relative thereto, further shifting the roller 66 to a release position whereat the roller 66 is positioned at an inflection point of the ratchet 48 such that a continued motion of the roller 66 thereafter will allow the roller 66 to disengage from the ratchet 48 whereupon ratchet 48 is free to rotate to the open position under the bias of ratchet biasing member 60 and/or as caused by door seal loads. Since the movement of the pawl 50 is causing rolling motion of the roller 66, and as a result a corresponding motion of the carrier 64, the pawl 50 may be configured to engage the arm 80 to synchronize the movement of the carrier 64 with the pawl 50 over a second stage of travel of the pawl 50 thereby urging the roller 66 to further ensure the roller 66 has moved away and out of engagement with ratchet 48.

Figure 14D:
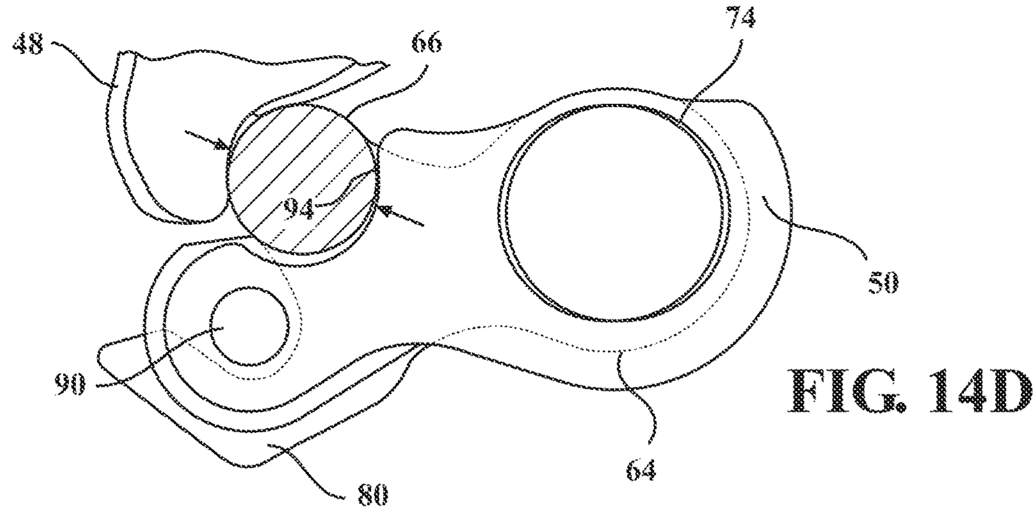
FIGS. 14D to 14F illustrate the force vectors acting upon the roller and carrier of the pawl assembly of FIG. 7.
Figure 14E:
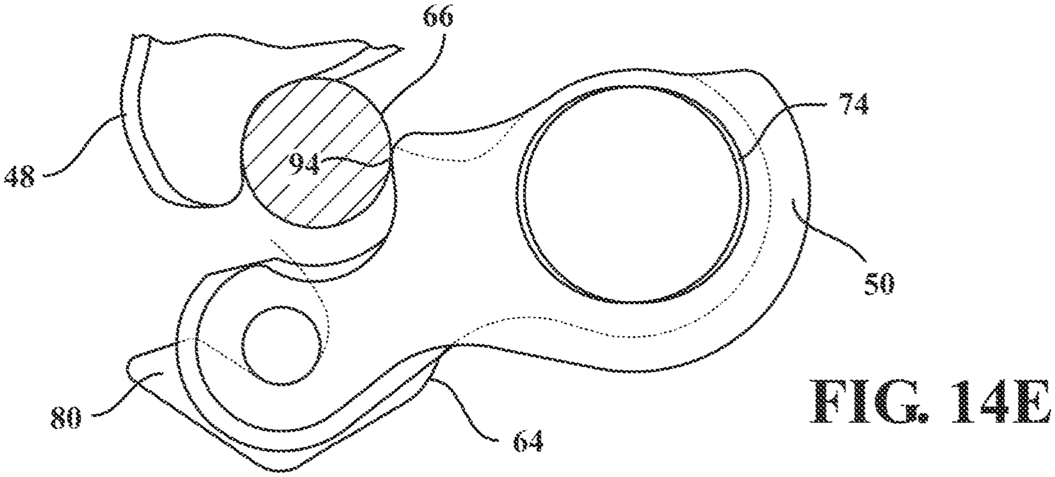
Figure 14F:
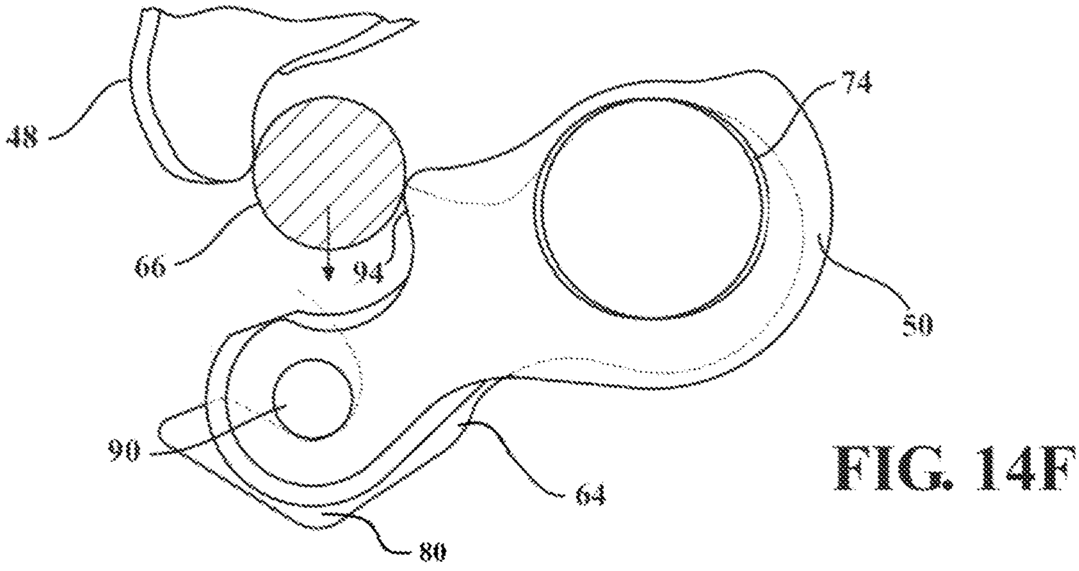

Now referring to FIG. 14D to 14F, another releasing operation is illustrated such as during an assisted releasing operation where the roller 66 is prevented from rolling. In FIG. 14D, the forces F acting upon the roller 66 are such that the roller 66 will not be urged to rotate in any significant direction. The pawl 50 has not been engaged to move to a ratchet releasing position. The pawl 50 has not been engaged to move to a ratchet releasing position. In FIG. 14E, the pawl 50 has been engaged to move to a ratchet releasing position and the movement of the recessed pocket 92 may not cause the roller 66 to roll relative thereto and out of closing notch 58 during a first stage of travel of the pawl 50 during which pawl 50, for example adjacent shoulder 94, slidably engages with roller 66 without causing movement of the roller 66. Alternatively, the movement of the recessed pocket 92 may cause slight movement of the roller 66 to impart rotation of the roller 66 relative to the recessed pocket 92 but insufficient motion to move the roller 66 out of closing notch 58 to the inflection point of the ratchet 48. The roller 66 being prevented from moving from the closing notch 58, the continued movement of the pawl 50 to a ratchet releasing position will not cause the roller 66 to move out of engagement between the pawl 50 and the ratchet 48 to ensure disengagement of the roller 66 from the ratchet 48 to allow the ratchet 48 to move to the striker release position. To ensure this does not occur and with reference to FIG. 14F, at a predetermined angular position, the pawl 50 will engage the arm 80 to synchronize the movement of the carrier 64 with the further movement of the pawl 50 over a second stage of travel of the pawl 50 thereby urging the roller 66 to move, for example by causing a sliding or by rolling of the roller 66 along the surfaces of the ratchet 48 and the pawl 50, until the roller 66 is out of engagement with the ratchet 48 and the pawl 50, and the ratchet 48 is allowed to move to the striker release position.

A detailed description of another non-limiting example of closure latch assembly 118, constructed in accordance with the teachings of the present disclosure, will now be provided, wherein the same reference numeral as above, offset by a factor of 100, are used to identify like features. In general, closure latch assembly 118 includes latch mechanism 119, which in turn includes a roller pawl assembly, referred to hereafter as pawl assembly 130, configured for operable communication with a ratchet 148 and other features as discussed above, such as a release lever link, provided here via a pawl lever 132, bridging and selectively connecting a release lever (not shown, but similar to release levers 28, 40 discussed above) in operable communication with the pawl assembly 130. One skilled in the art will readily appreciate other features, such as illustrated and discussed above with respect to closure latch assembly 18, can be incorporated with closure latch assembly 130.

Figure 15:
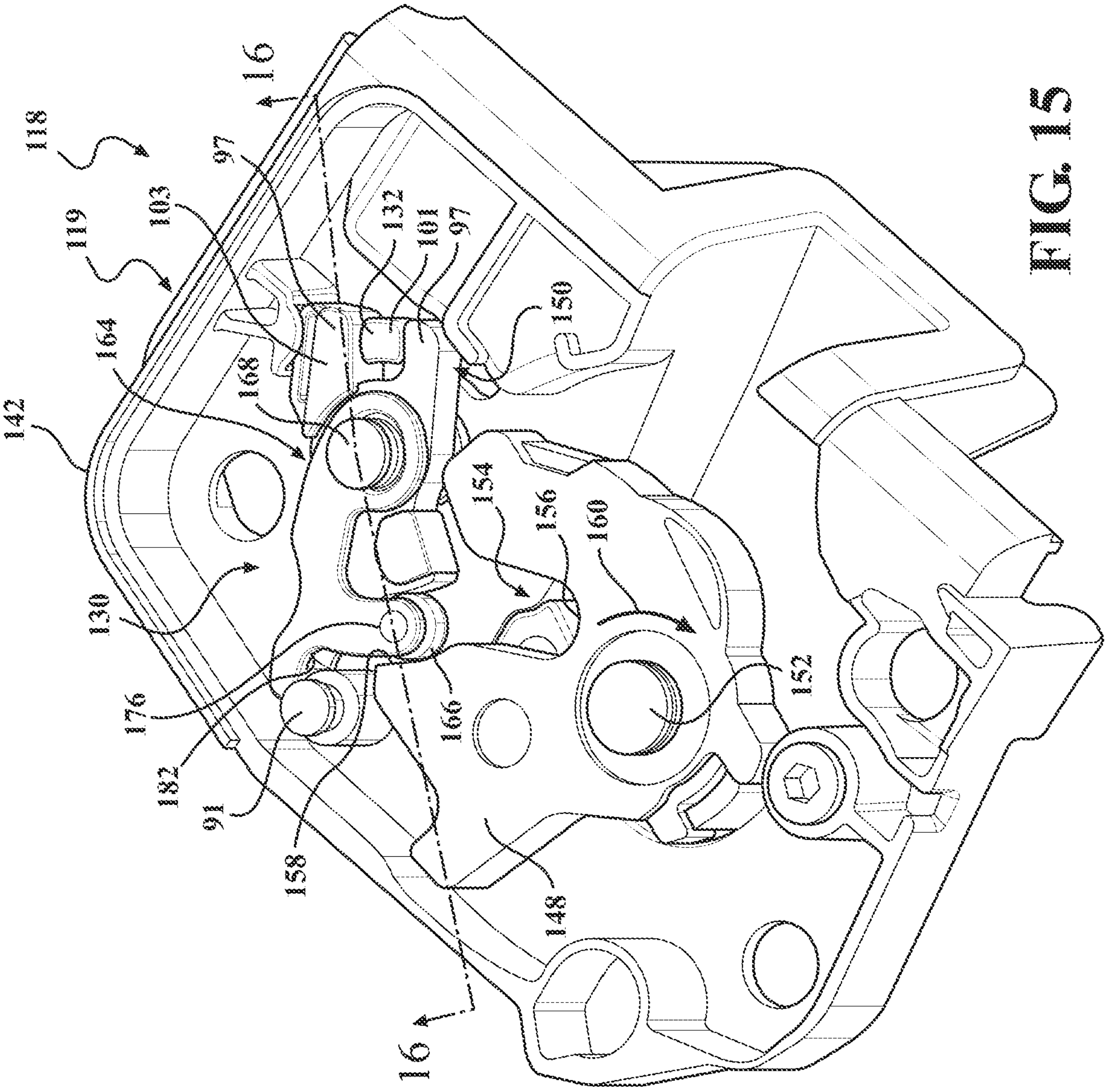
FIG. 15 is a perspective view of a closure latch assembly in accordance with another aspect of the disclosure configured for use in the passenger swing door of FIG. 1, with various components removed and with a pawl assembly thereof shown in transparency for clarity purposes only.

As discussed above, ratchet 148 is supported for rotational movement relative to a frame plate 142 via a ratchet pivot pin 152. Ratchet 148 is configured to include a contoured guide channel 154 configured to terminate at a closed end striker capture pocket 156 and an open end closing surface 158, shown as being generally flat or slightly arcuate, such as being slightly concave. A ratchet biasing member, schematically shown in FIG. 15 by arrow 160, is adapted to normally bias ratchet 148 to rotate about ratchet pivot pin 152 in a first, opening or "releasing" direction (i.e. clockwise in FIG. 15).

Figure 18:
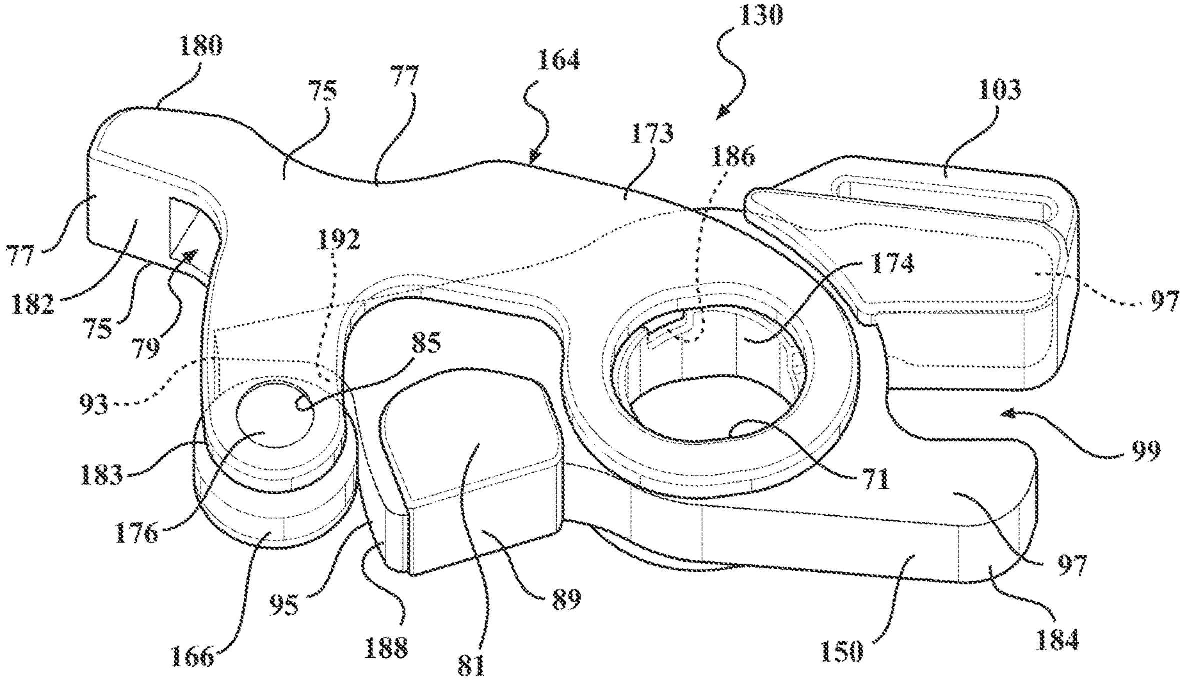
FIG. 18 is a perspective view of the pawl assembly of the closure latch assembly of FIG. 15.

As best shown in FIG. 18, the pawl assembly 130 includes a pawl insert, referred to hereafter simply as pawl 150, a roller lever, also referred to as carrier member 164, and referred to hereafter as carrier 164, a rolling member 166, also referred to as roller pin, and referred to hereafter simply as roller 166, and a pawl support member 168, also referred to as pawl pin or pawl rivet 168. The pawl rivet 168 is fixed, such as to the frame plate 142, with carrier 164 and pawl 150 being configured for selective rotation about a central longitudinal axis A (FIG. 16) of the pawl rivet 168. As further shown in FIG. 16, the pawl rivet 168 has a radial shoulder, shown as an annular flange 170, extending radially outwardly from a cylindrical section 172. The cylindrical section 172 has a first diameter D1.

Figure 16:
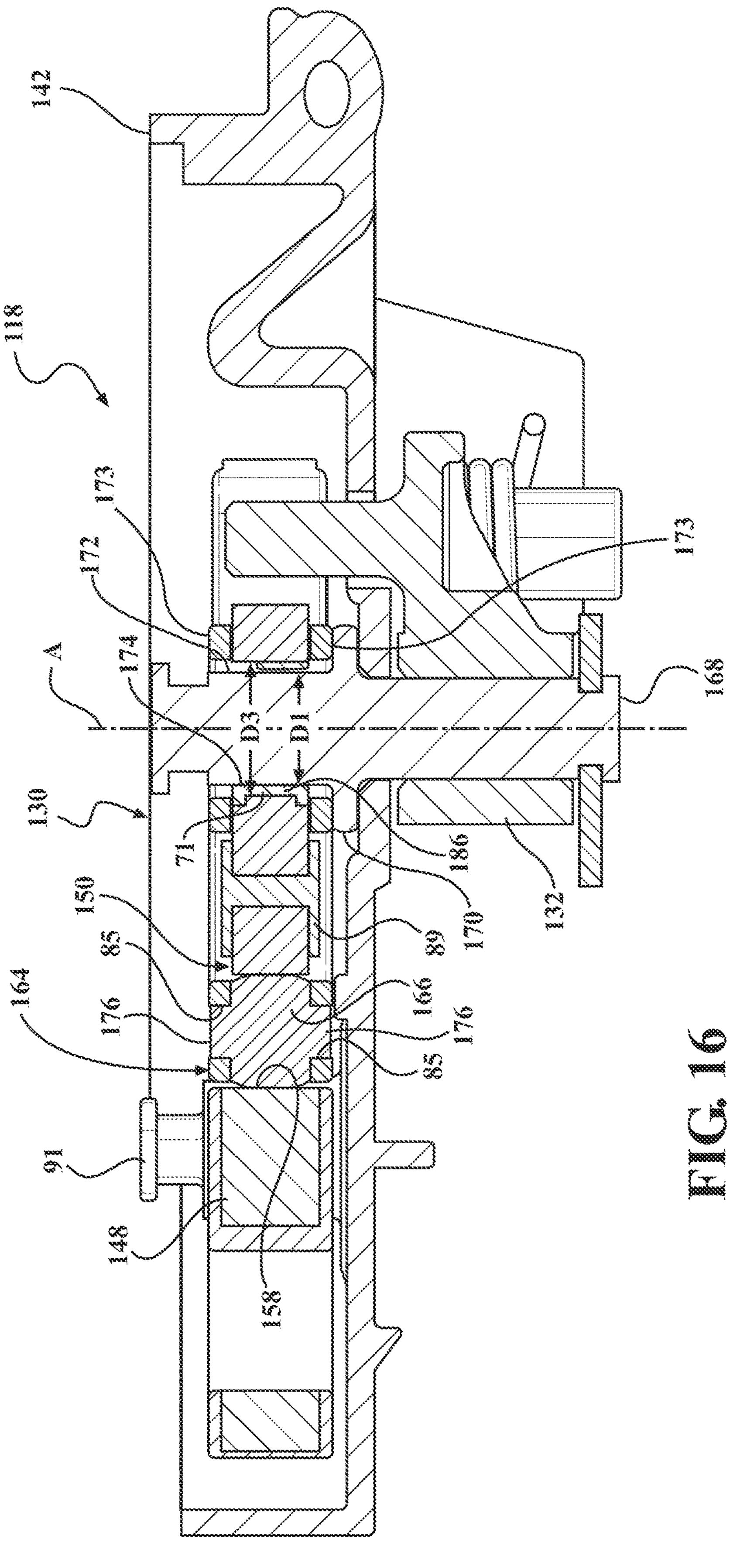
FIG. 16 is a cross-sectional view taken generally along the line 16-16 of FIG. 15.

As best shown in FIG. 18, the carrier 164, in a non-limiting embodiment, has a channel-shaped main body 173 with opposite planar main body surfaces, also referred to as plates, and referred hereafter as sidewalls 75, interconnected with one another via at least one peripheral intermediate wall 77 such that the sidewalls 75 are parallel with one another to define a cavity 79 therebetween. The cavity 79 is sized for pivoting movement of the pawl 150 therein. As best shown in FIGS. 16 and 18, at least one or both of the opposite sidewalls 75 have a tubular wall portion 71 extending toward and being fixed to the opposite sidewall 75 to form a through opening, shown as an oblong or elliptical through opening 174, by way of example and without limitation. The through opening 174 is sized for a clearance fit (FIG. 16) about cylindrical section 172 of pawl rivet 168. The clearance fit established between pawl rivet 168 and through opening 174 inhibits radial loading between the pawl rivet 168 and carrier 164 during selective rotation of carrier 164 and pawl 150 about pawl rivet 168. The sidewalls 75 of the carrier 164 further include extensions, also referred to as nose region, and referred to hereafter as roller support members 183 spaced from one another by a portion of the cavity 79 formed between the opposite sidewalls 75. The carrier 164 and support members 183 may be formed from a plastic material as an example. The roller support members 183 and the tubular wall(s) forming the through opening 174 are spaced from one another to form a generally U-shaped pocket 81 configured to allow pivotal movement of a bumper 89 on a second end region 188 (FIG. 18) of the pawl 150 therein. The bumper 89 can be formed of any suitable resilient, elastomeric material the acts to dampen noise upon impact of a portion of the ratchet 148 thereagainst, such as during closing movement of the vehicle door 16. The roller support members 183 each have a through hole 85 (FIGS. 16 and 18), wherein the through holes 85 are axially aligned with one another for receipt of an axle 176 of the roller 166 therein to retain and to provide for free rolling of the roller 166 adjacent and laterally spaced from the roller support members 183 between the pawl 150 and the closing surface 158 of ratchet 148. Roller 166 can be formed as a single, monolithic piece of material with axles 176, such as from any suitable polymeric material, including rubber of a desired durometer. With the roller 166 being formed as a single piece of material with axles 176, such as via molding process, by way of example and without limitation, roller support members 183 can simply be biased away from one another to allow the axles 176 to be disposed into the through holes 85, whereupon the bias on the roller support members 183 can be released to allow the roller support members 183 to resiliently return to their parallel relation with one another, thereby capturing the roller 166 for rolling movement therebetween. The carrier 164 further includes an elongate extension 180, also referred to as arm 180 formed as an extension of the opposite sides 75 outwardly from the roller support members 183 and away from through opening 174 to form a recessed pocket 182 therebetween. Elongate extension 180 and pocket 182 functions as a stop surface when brought into biased abutment with a fixed stop member, shown as a protrusion, also referred to as stop surface or pin 91, which is fixed to and extends laterally from frame plate 142, with the functionality discussed in more detail below.

Figure 17:
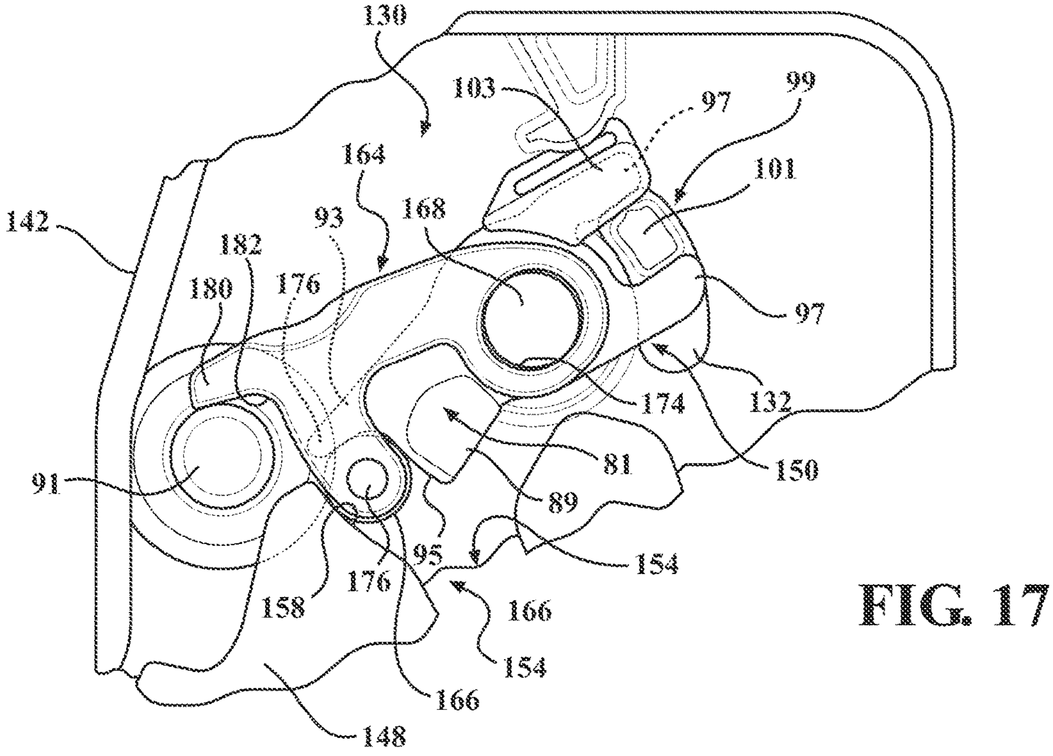
FIG. 17 is an enlarged partial side view of a ratchet and pawl assembly of the closure latch assembly of FIG. 15 shown in a closed, ratchet holding position.

The pawl 150 has a first end region 184 opposite the second end region 188, with a through opening 186 having a third diameter D3 sized for receipt about the tubular wall portion 71 of carrier 164 (FIG. 16) being formed between the first end region 184 and the second end region 188. The through opening 186 is sized for a close, minimum play loose fit about tubular wall portion 71, such that pawl 150 is free to rotate in a close fit about tubular wall portion 71 within cavity 79 of carrier 164. Accordingly, pawl 150 is captured between and sidewalls 75 for pivotal movement within cavity 79 by tubular wall portion 71. The pawl 150 has a stop member, also referred to as a nose portion, and referred to hereafter as protrusion 93, that extends outwardly from the second end region 188 and away from the first end region 184. Upon capturing the pawl 150 between sidewalls 75, the protrusion 93 is captured for pivotal movement between roller 166 and the intermediate wall 77 extending to arm 180. Pawl 150 has an arcuate recessed pocket 192 adjacent the second end region 188, with pocket 192 being defined between protrusion 93 and a roller engagement surface 95 (FIGS. 17 and 18). Roller engagement surface 95 is contoured for smooth rolling abutment with roller 166 as pawl 150 is selectively pivoted with cavity 79. The first end region 184 has bifurcated fingers 97 with a recessed pocket 99 (FIG. 18) formed therebetween. The recessed pocket 99 is sized for close receipt of a tab 101 of pawl lever 132 therein, such that separate ones of the fingers 97 extend along opposite sides of the tab 101. As such, selective movement of the pawl lever 132 causes tab 101 to pivot pawl 150 about pawl rivet 168 and within cavity 79, as discussed further below. A bumper 103 can be disposed on at least one of the fingers 97 for cushioning engagement with tab 101. The bumper 103 can be formed of any suitable resilient, elastomeric material the acts to dampen noise upon impact of tab 101 thereagainst, such as during closing movement of the vehicle door 16.

Figure 19A:
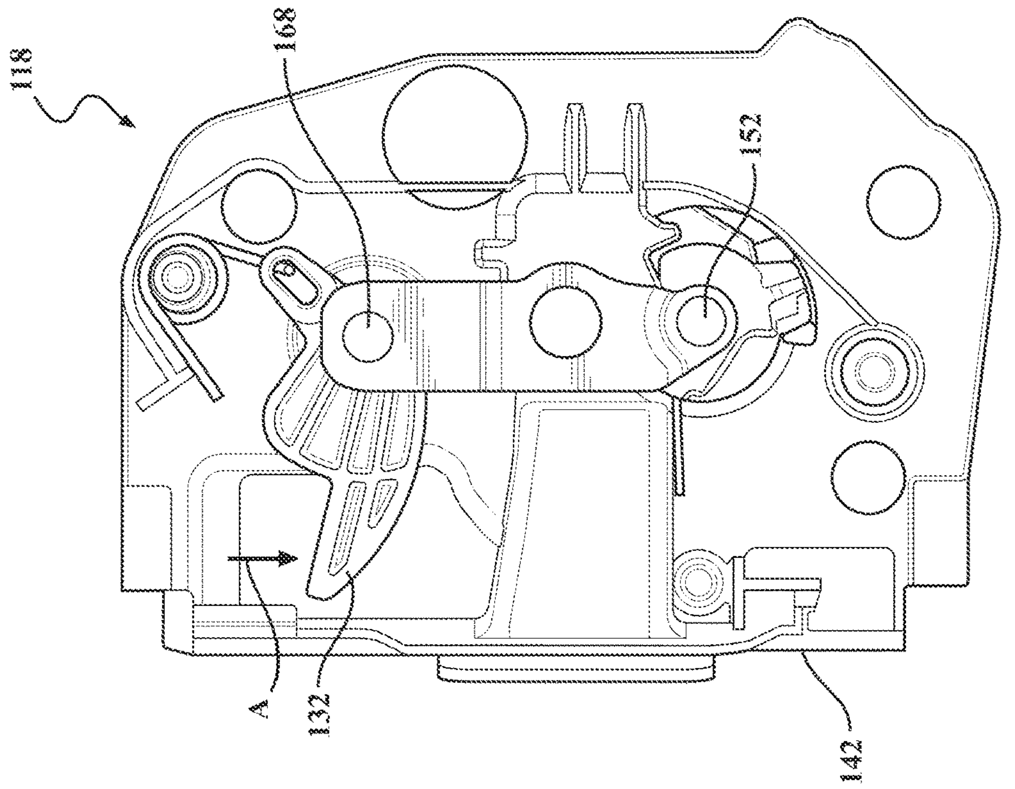
FIGS. 19-19A through 22-22A illustrate the pawl assembly being progressively biased toward a ratchet releasing position, with FIGS. 19A-22A being respective back side views of FIGS. 19-22.
Figure 19:
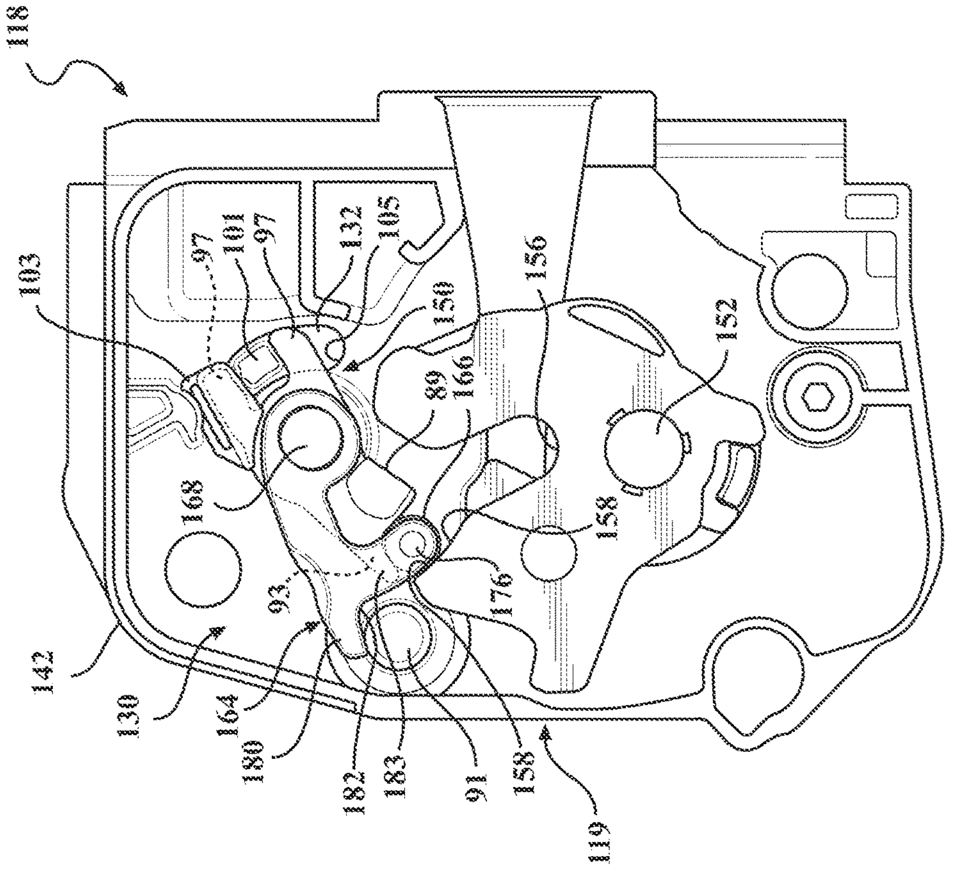
Figure 20A:
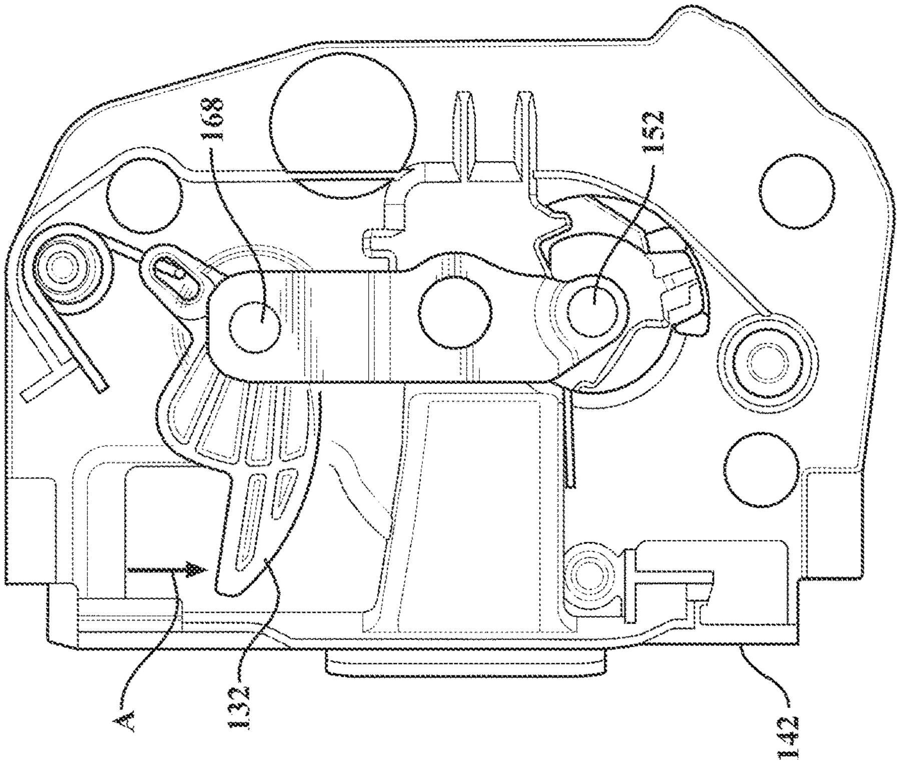
Figure 20:
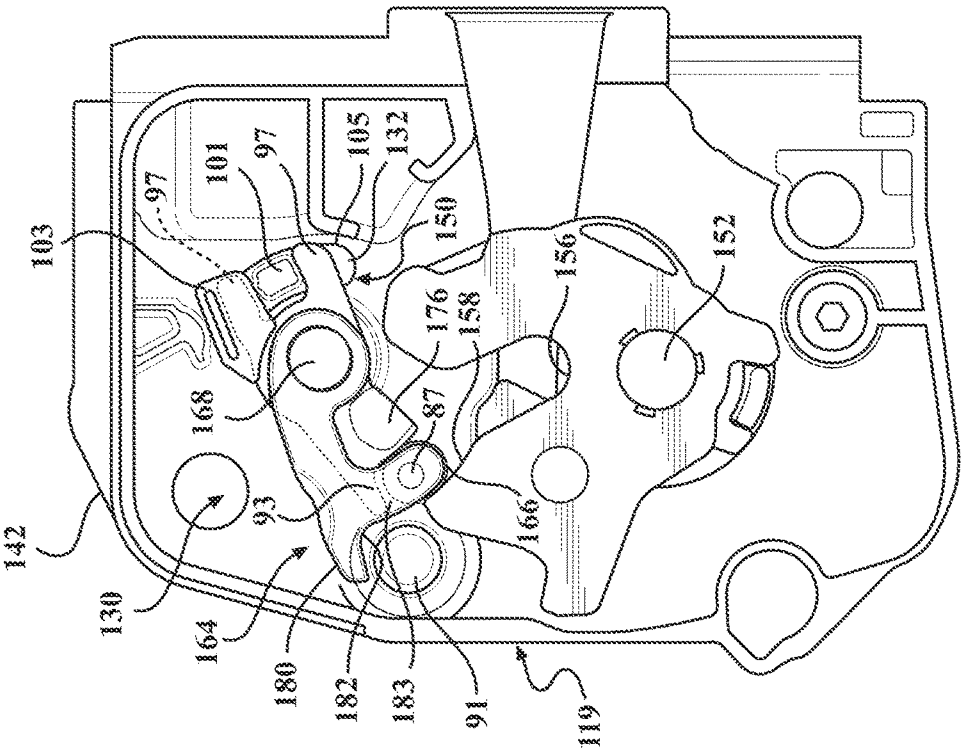
Figure 21A:
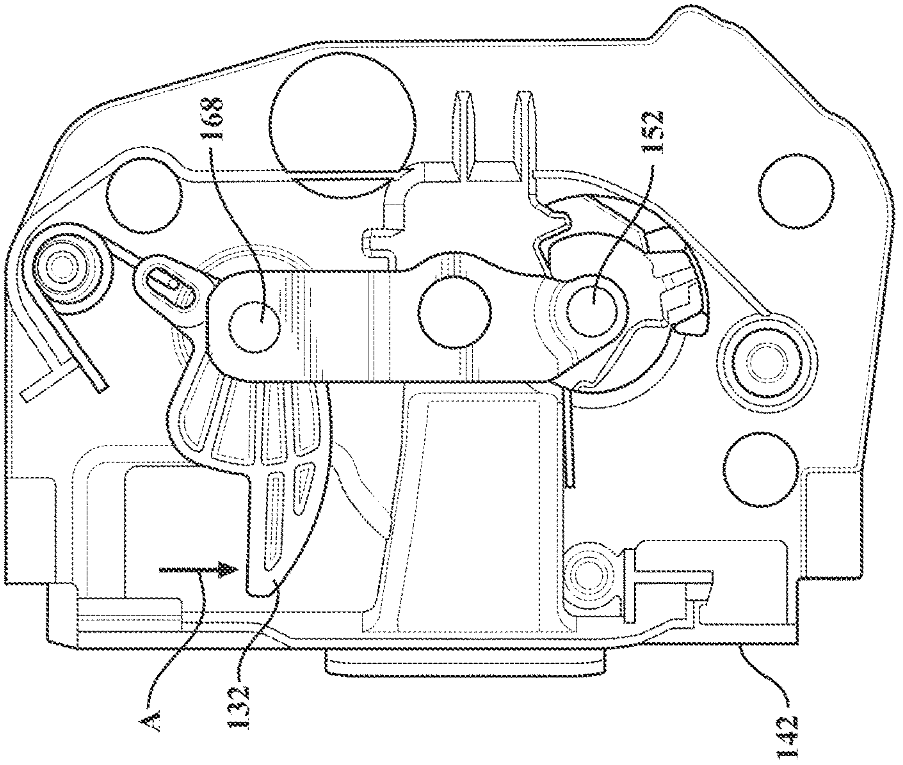
Figure 21:
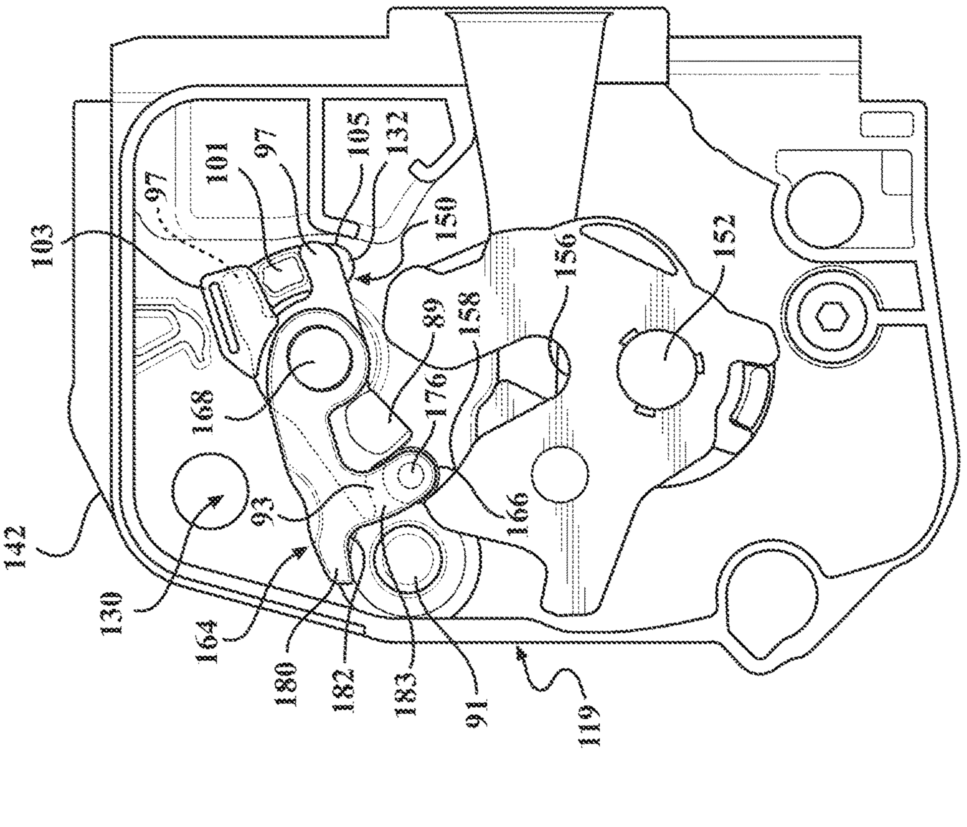

In use, when the swing door 16 is in a fully-closed position, the latch mechanism 119 is as appears in FIG. 19, with the roller 166 in seated abutment with the closing surface 158 of ratchet 148 and in seated abutment with the roller engagement surface 95 of pawl 150 within pocket 192. When in the unlocked state, upon actuation outside release lever, such as discussed above with regard to outside release lever 40, pawl lever 132 is caused to be driven in the direction of arrow A (FIGS. 19A-22A) against a bias of a biasing spring member (not shown), whereupon tab 101 pivots within a slot 105 and causes pivotal movement of pawl 50 about pawl rivet 168. As the pawl lever 132 is continues to be driven in an opening or unlatching direction, such as discussed above with regard to release link lever 32, tab 101 continues to drive one of the fingers of pawl 150 to continue the rotation of the pawl 150 from its ratchet holding position to its ratchet releasing position.

Figure 22A:
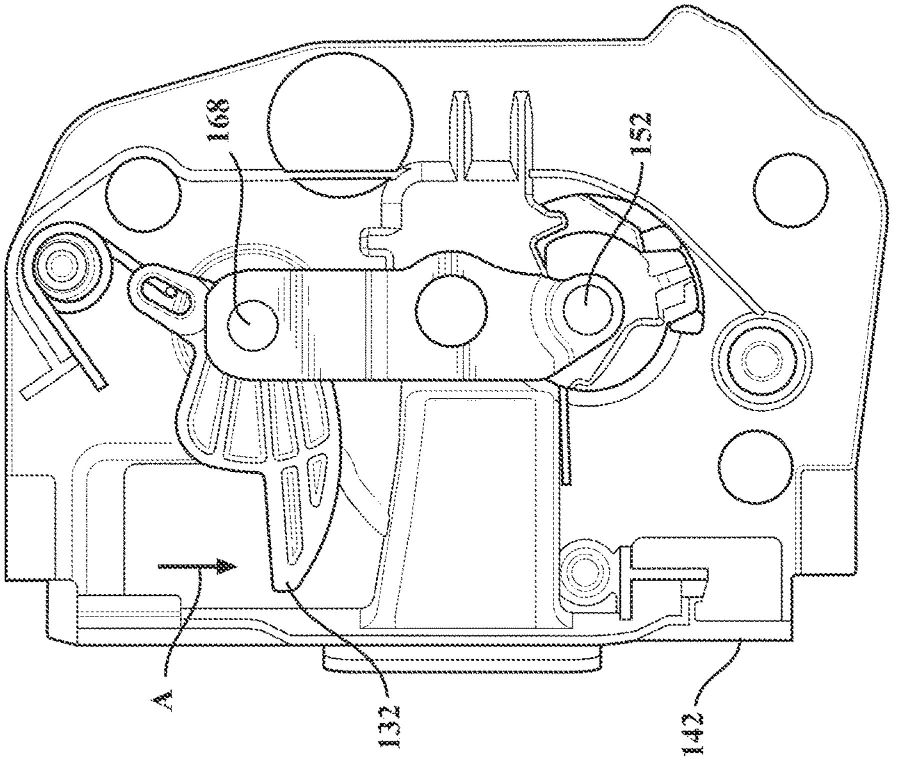
Figure 22:
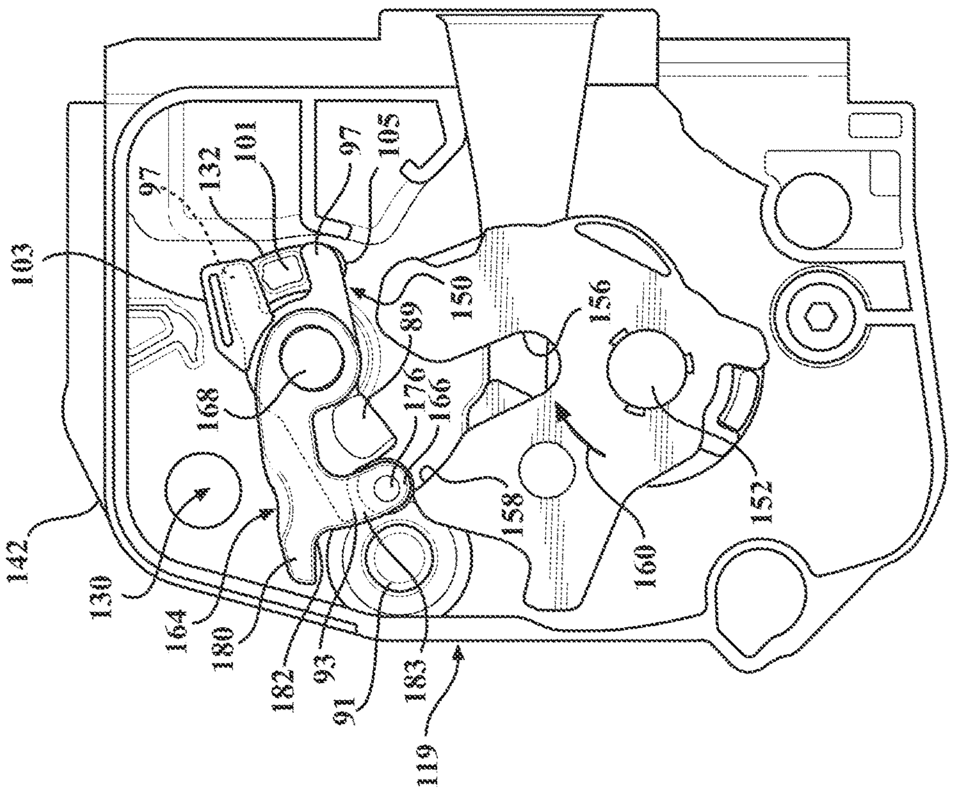
Figure 23A:
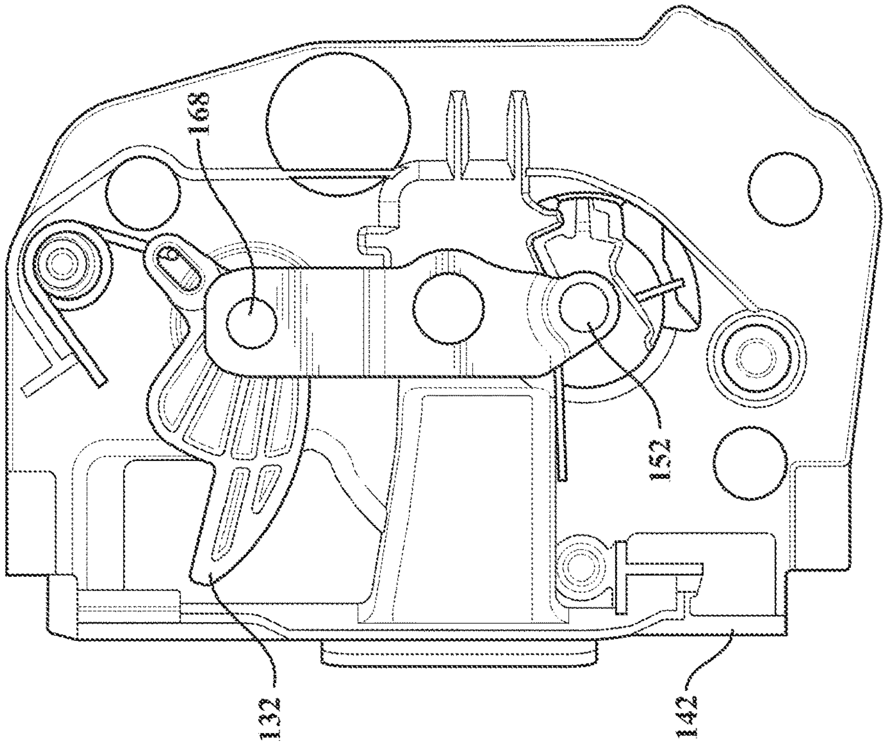
FIG. 23A is a back side view of FIG. 23.
Figure 23:
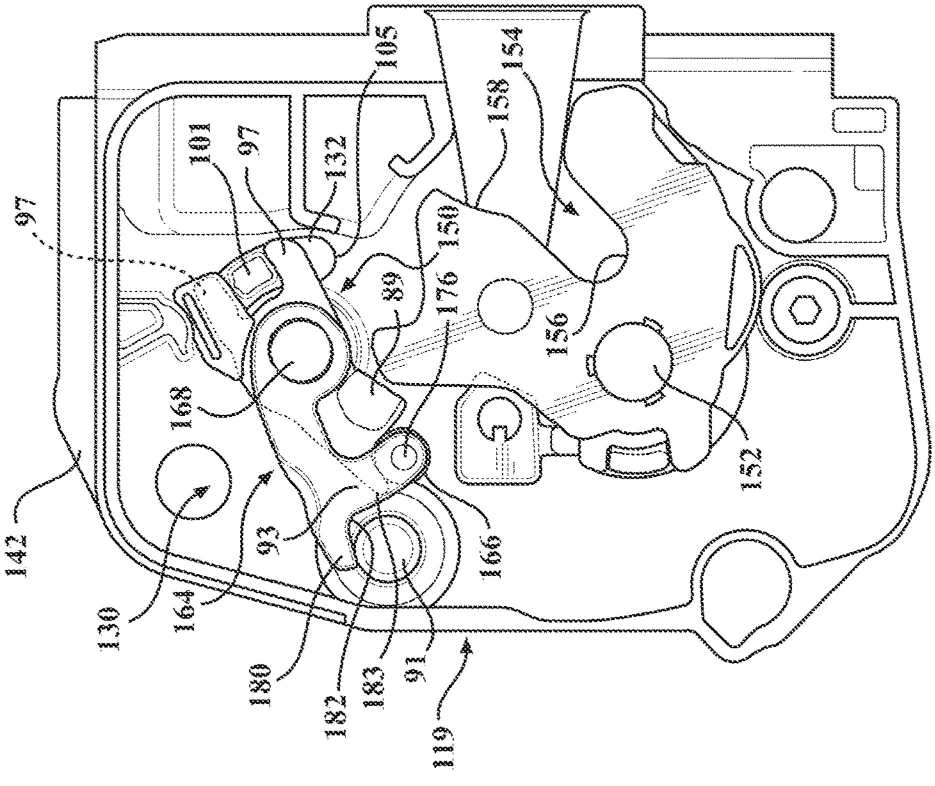
FIG. 23 illustrates the ratchet in an open, released position and the pawl assembly returned to a rest position.
Figure 24:
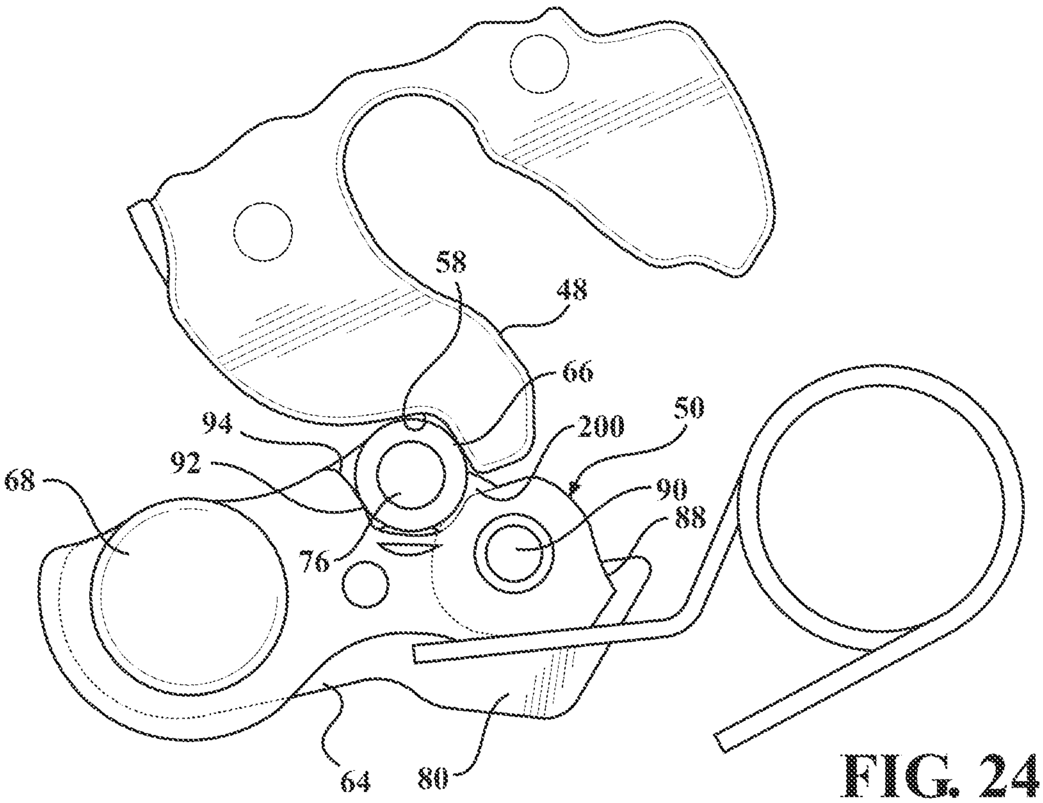
FIGS. 24 through 27 show a series of views of a release operation with the roller being retained on one side by a barrier provided on the pawl.
Figure 25:
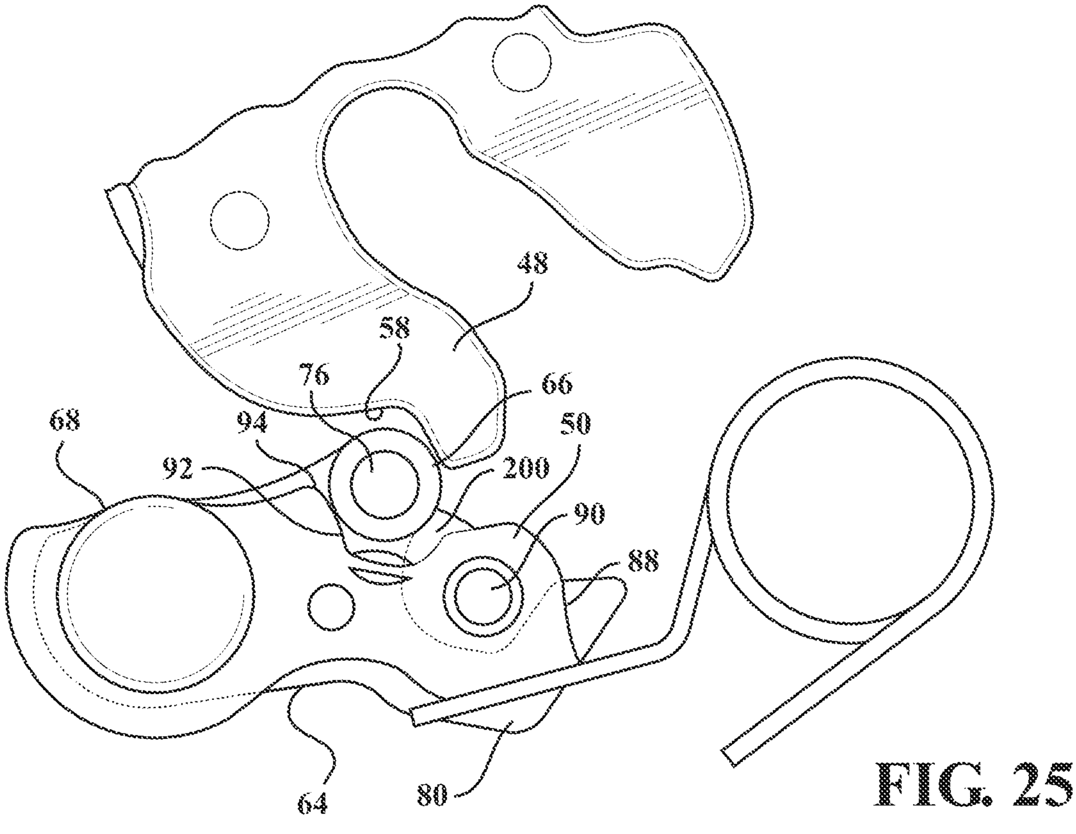
Figure 26:
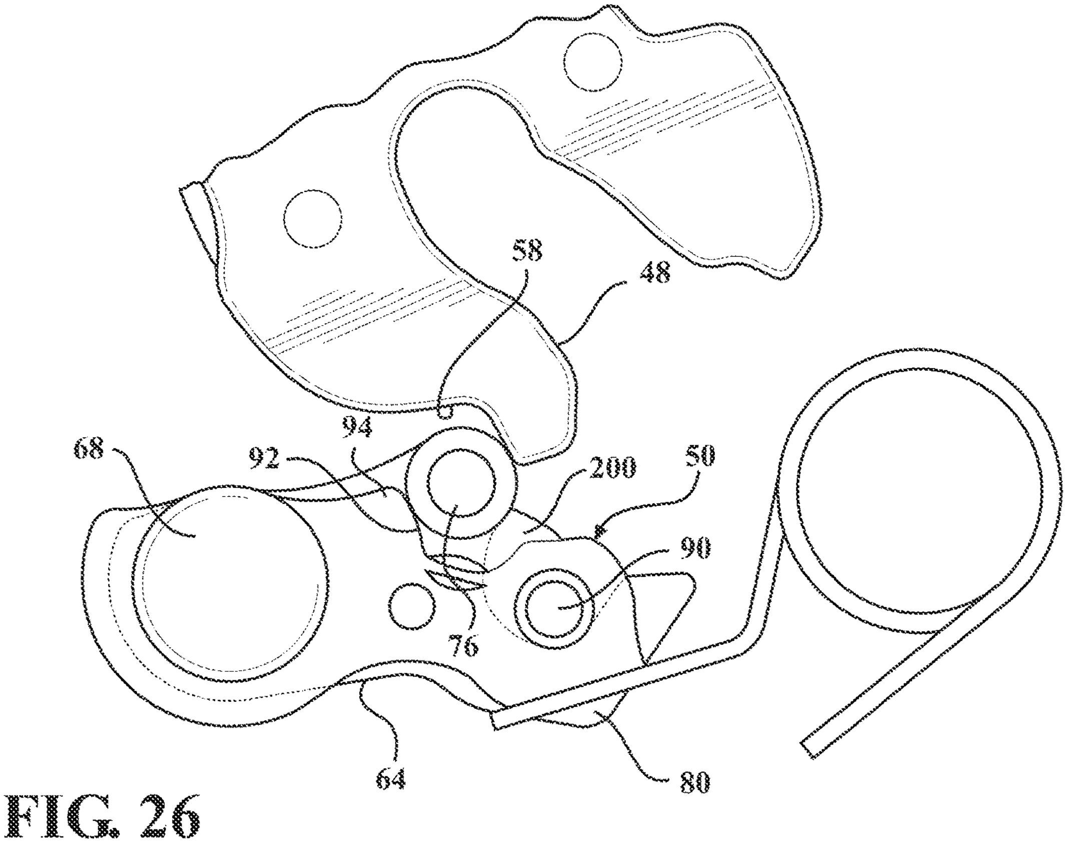
Figure 27:
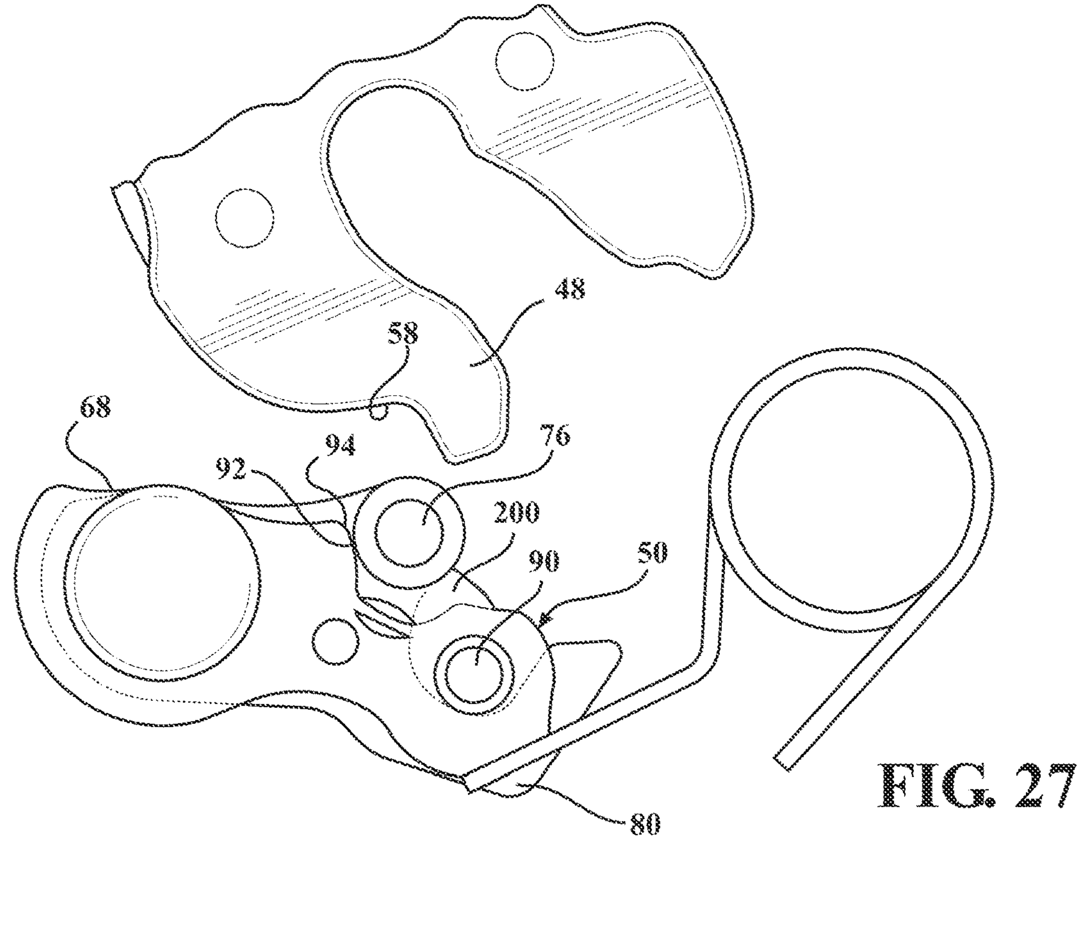

As pawl 150 is initially rotated about pawl rivet 168 within cavity 79 under the direct bias of the tab 101 of pawl lever 132, the roller engagement surface 95 of pawl 150 causes direct and proportional rolling movement of roller 166 along the closing surface 158 of ratchet 148. As the roller 166 rolls along the closing surface 158 of ratchet 148, the carrier 164, supporting the roller 166, is caused to pivot away from pin 91. Accordingly, pure rolling movement of the roller 166 generated via pivoting movement of the pawl 150 causes the carrier 164 to pivot away from the ratchet 148. As such, the loading between ratchet 148 and pawl 150 is solely through roller 166 and the pure rolling motion of roller 166, which is in-line and coplanar with ratchet 148, pawl 150, and carrier 164, and thus, no torsion is applied on roller 166, thereby facilitating pure rolling motion. With the rolling motion of roller 66 being pure rolling motion, no sliding friction is generated between ratchet 148 and roller 166 nor between pawl 150 and roller 166. Accordingly, minimal force is required to actuate movement of pawl 150, roller 166 and carrier 164 from their ratchet holding position toward and ultimately to their ratchet releasing position. In the event the rolling motion of roller 66 is prevented, for example due to debris, such as dirt accumulating between the roller 66 and the ratchet 148 and/or pawl 150 surfaces, thereby acting as a wedge to prevent the rolling motion of the roller 166 and prevent the ratchet 148 from being able to move to the ratchet releasing position, the carrier 164 is configured such that at an angular position of the pawl 150, for example between 12 and 16 degrees of pawl rotation defining for example a second stage of pawl motion or rotation, the protrusion 93 engages intermediate wall 77 so as to urge, or "push" during the second stage of pawl motion or rotation, the carrier 164 and thus the roller 166 out of engagement between the pawl 150 and the ratchet 148 to ensure disengagement of the roller 166. The roller 166 may be caused to slide by such urging the roller 166 is sufficiently wedged, or the urging may be sufficient to dislodge any debris such that the roller 66 may be allowed to roll. The through opening 186 may also provide some freedom of movement for the roller 166 as discussed herein above to assist with overcoming any such debris without loads being transferred to the pawl rivet 168 in the process. As actuation progresses, and as pawl 150 continues to rotate under the bias of pin 101, as caused by the continued motion of the pawl lever 132, pawl 150 causes roller 166 to move out of engagement with roller engagement surface 95 to a full open position (FIG. 22 shows roller 166 just prior to being moved out of engagement with roller engagement surface 95), whereupon ratchet 148 is free to rotate to the open position under the bias of ratchet biasing member (shown schematically in FIG. 22 via arrow 160). With the ratchet 148 in its open position, carrier 164 and pawl 150 are caused to return under the bias of a spring member to their home positions, with the protrusion 93 being brought into abutment with the roller 166 and the arm 180 being returned into abutment with pin 91. While in their home positions, the roller 166 is automatically positioned, due to the positioning of carrier 164 provided by pin 91, for abutment with closing surface 158 of ratchet 148 upon the ratchet 148 being returned to its closed position, and thus, as will be readily appreciated by one skilled in the art, latch mechanism 119 is automatically reset upon returning the swing door 16 to its closed position.

Now referring to FIGS. 23 to 27, in accordance with another embodiment, the pawl 50 is provided with a retaining barrier 200 to ensure that the roller 66 remains engaged with the pin 76. Illustratively the retaining barrier is shown as a bridge element extending across the arcuate recessed pocket 92 adjacent the second end region 88 on one side of the pawl 50. As illustrated in the sequence of FIGS. 23 to 26, the retaining barrier 200 is positioned throughout the movement of the roller 66 to ensure the roller does not become disengaged from the pin 76.

Figure 28:
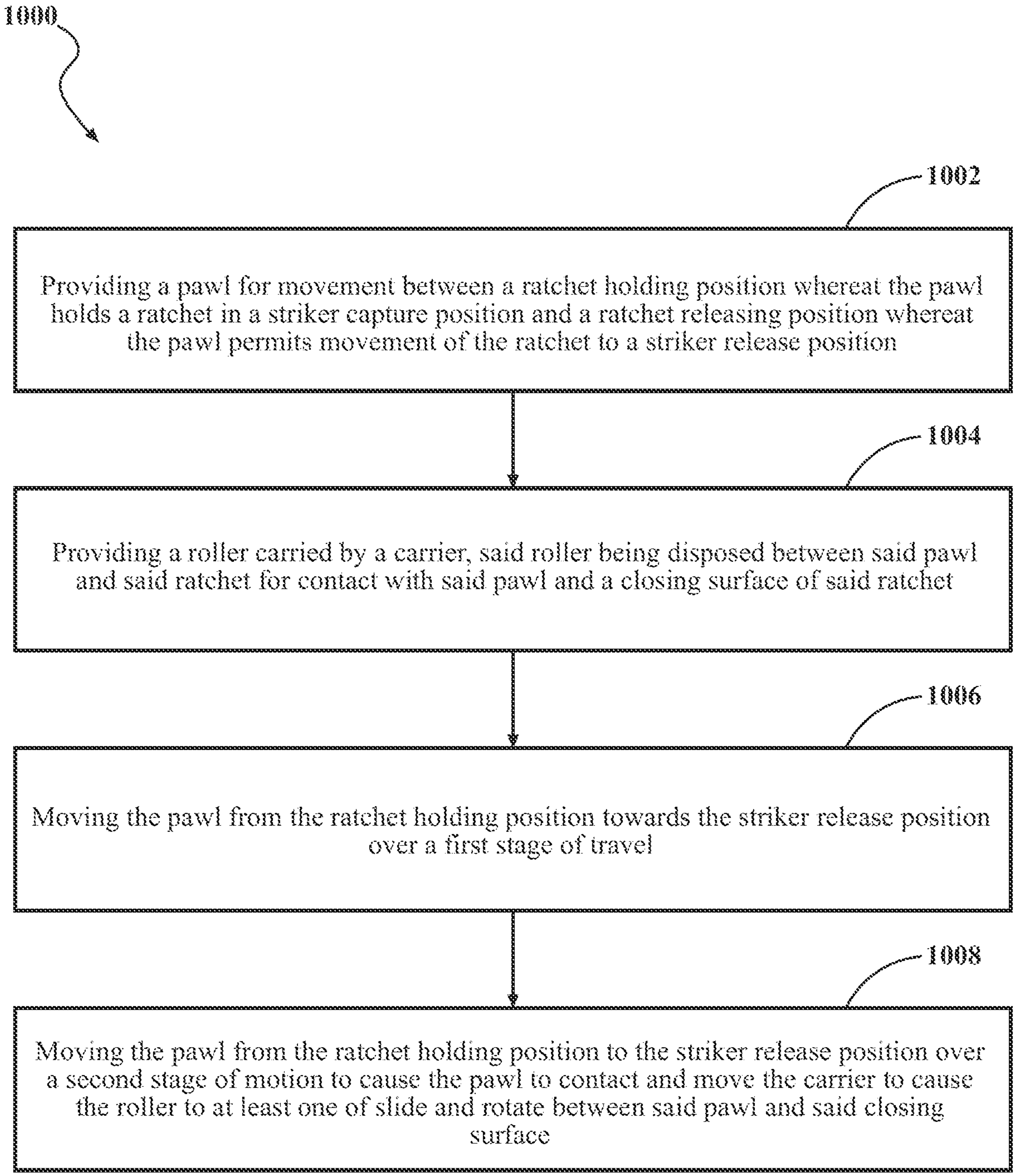
FIG. 28 illustrates a method of operating a closure latch assembly, in accordance with an illustrative embodiment.

Now referring to FIG. 28, there is provided a method of operating a closure latch assembly having a latch mechanism 1000, the method 1000 including the steps of providing a pawl for movement between a ratchet holding position whereat the pawl holds the ratchet in the striker capture position and a ratchet releasing position whereat the pawl permits movement of the ratchet to the striker release position 1002, providing a roller carried by a carrier, said roller being disposed between said pawl and said ratchet for contact with said pawl and said closing surface of said ratchet 1004, moving the pawl from the ratchet holding position towards the striker release position over a first stage of travel 1006, and moving the pawl from the ratchet holding position to the striker release position over a second stage of motion to cause the pawl to contact and move the carrier to cause the roller to at least one of slide and rotate between said pawl and said closing surface 1008.

Figure 7:
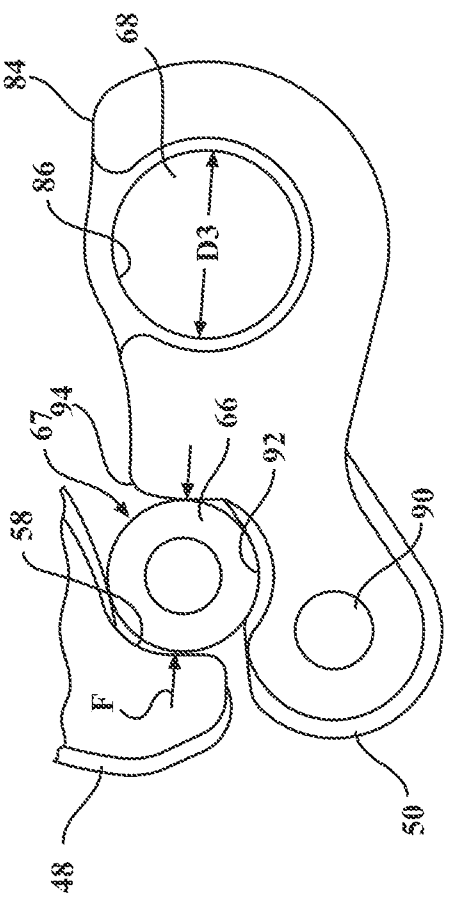
FIG. 7 is a fragmentary side view of the pawl assembly and ratchet shown engaged with one another.

In view of the above disclosure, and in further view of the figures, one skilled in the art, upon viewing the entirety of the disclosure herein, will readily appreciate the minimal force required to actuate the latch mechanism 19 between the ratchet holding and releasing positions. Further yet, with the extremely low friction provided by the pure rolling motion of roller 66 along ratchet 48 and pawl 50, noise generated during actuation of the latch mechanism 19 is minimal. It is to be recognized that the primary role of carrier 64 is to carry and position roller 66 for pure rolling motion between ratchet 48 and pawl 50 and to return roller 66 between ratchet 48 and pawl 50 upon closing swing door 16, and that ultimately carrier 64 remains free from forces during rolling movement of roller 66 between ratchet 48 and pawl 50. Accordingly, carrier 64 serves solely to carry roller 66, to prevent inadvertent interference of roller 66 with ratchet 48 when pawl 50 is intended to remain in the ratchet releasing position. Thus, it should be recognized that carrier 64 is not intended to transfer force between ratchet 48 and pawl 50 and is assured of such as a result of being free to move in opposite directions within through opening 74, wherein roller 66 is the sole mechanism for transferring force F (FIG. 7) between ratchet 48 and pawl 50.

The foregoing description of the several embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example detection system can likewise be implemented into many other systems to control one or more operations and/or functions.

What is claimed is:

1. A closure latch assembly comprising:

a frame plate with a ratchet pivotally supported by a ratchet pivot pin, wherein the ratchet is pivotally moveable between a striker release position, whereat the ratchet is positioned to release a striker, and a striker capture position, whereat the ratchet is positioned to retain the striker, with the ratchet being biased toward the striker release position and having a closing notch; and a pawl assembly pivotally supported on the frame plate by a pawl pin for pivotal movement between a ratchet holding position, whereat the pawl assembly is positioned to hold the ratchet in the striker capture position, and a ratchet releasing position, whereat the pawl assembly is located to permit pivotal movement of the ratchet to the striker release position, wherein the pawl assembly is biased toward the ratchet holding position;

the pawl assembly comprising a carrier plate and a pawl configured for pivotal movement relative to one another about the pawl pin and a roller carried by the carrier plate for rotation thereon, the carrier plate for positioning the roller between the pawl and the ratchet for selective rolling contact with the pawl and the ratchet;

wherein the carrier plate is adapted to move radially relative to the pawl pin.

2. The closure latch assembly of claim 1, wherein the carrier plate and the pawl pin have a clearance fit with one another.

3. The closure latch assembly of claim 1, wherein the carrier plate comprises a non-circular through opening in the carrier plate.

4. The closure latch assembly of claim 3, wherein the through opening in the carrier plate is elliptical.

5. The closure latch assembly of claim 4, wherein the elliptical through opening has a major axis and a minor axis, wherein the major axis is substantially aligned with a direction of a force acting on the roller by the ratchet during initial movement of the ratchet from the striker capture position toward the striker release position.

6. The closure latch assembly of claim 1, wherein loading between the ratchet and the pawl is solely through the roller.

7. The closure latch assembly of claim 6, wherein the loading between the ratchet and the pawl is not imparted to the carrier plate.

8. The closure latch assembly of claim 1, wherein the roller is cantilevered from the carrier plate via a pin extending from the carrier plate.

9. The closure latch assembly of claim 1, further comprising a retaining barrier opposite the carrier plate to retain the roller in position between the ratchet and the pawl.

10. The closure latch assembly of claim 9, wherein the retaining barrier is provided on the pawl.

11. The closure latch assembly of claim 1, wherein the pawl comprises a through opening having a first diameter for receiving the pawl pin, and the carrier plate comprises a through opening having a second diameter for receiving the pawl pin, wherein the second diameter is larger than the first diameter.

12. The closure latch assembly of claim 1, wherein the carrier plate has a through opening for receiving the pawl pin.

13. A closure latch assembly having a latch mechanism is provided, wherein the latch mechanism includes:

a frame plate with a ratchet pivotally supported by a ratchet pivot pin, wherein the ratchet is pivotally moveable between a striker release position, whereat the ratchet is positioned to release a striker, and a striker capture position, whereat the ratchet is positioned to retain the striker, with the ratchet being biased toward the striker release position and having a closing notch; and a pawl assembly pivotally supported on the frame plate by a pawl pin for pivotal movement between a ratchet holding position, whereat the pawl assembly is positioned to hold the ratchet in the striker capture position, and a ratchet releasing position, whereat the pawl assembly is positioned to permit pivotal movement of the ratchet to the striker release position, with the pawl assembly being biased toward the ratchet holding position, the pawl assembly comprising a carrier plate and a pawl configured for pivotal movement relative to one another about the pawl pin and a roller mounted to the carrier plate for rotation thereon, the carrier plate for positioning the roller between the pawl and the ratchet for selective rolling contact with the pawl and the ratchet;

wherein the carrier plate supports the roller for allowing radial and tangential motion of the roller relative to the pawl pin during pivotal movement of the pawl towards a release position.

14. The closure latch assembly of claim 13, wherein the carrier plate is adapted to pivotally move in opposite directions towards and away from the ratchet.

15. A closure latch assembly having a latch mechanism is provided, wherein the latch mechanism includes:

a frame plate with a ratchet pivotally supported thereon by a ratchet pivot pin, wherein the ratchet is pivotally moveable between a striker release position, whereat the ratchet is positioned to release a striker, and a striker capture position, whereat the ratchet is positioned to retain the striker, with the ratchet being biased toward the striker release position and having a closing notch; and a pawl assembly pivotally supported on the frame plate by a pawl pin for pivotal movement between a ratchet holding position, whereat the pawl assembly is positioned to hold the ratchet in the striker capture position, and a ratchet releasing position, whereat the pawl assembly is positioned to permit pivotal movement of the ratchet to the striker release position, the pawl assembly being biased toward the ratchet holding position, the pawl assembly comprising a carrier and a pawl configured for pivotal movement relative to one another about the pawl pin and a roller mounted to the carrier for rotation thereon, the carrier for positioning the roller between the pawl and the ratchet for selective rolling contact with the pawl and the ratchet;

wherein loading imparted on the roller by the ratchet is not imparted to the pawl pin via the carrier.

16. The closure latch assembly of claim 15, wherein the carrier includes a through opening for receiving the pawl pin, and wherein the carrier is adapted to pivotally move about the pawl pin to prevent the pawl pin being radially loaded by the carrier.

17. The closure latch assembly of claim 16, wherein the carrier is a plate.

18. The closure latch assembly of claim 15, further comprising a roller pin extending from the carrier, wherein the roller is a cylinder having a central bore for receiving the roller pin.

19. The closure latch assembly of claim 18, wherein the roller pin does not experience torsion imparted by the roller thereon.

* * * * *